US011494493B1

(12) United States Patent
Baird

(10) Patent No.: US 11,494,493 B1
(45) Date of Patent: Nov. 8, 2022

(54) SOFTWARE VERIFICATION FOR NETWORK-ACCESSIBLE APPLICATIONS

(71) Applicant: Amazon Technologies, Inc., Seattle, WA (US)

(72) Inventor: Andrew Baird, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 16/579,748

(22) Filed: Sep. 23, 2019

(51) Int. Cl.
*G06F 11/30* (2006.01)
*G06F 21/57* (2013.01)
*G06F 21/60* (2013.01)
*H04L 9/08* (2006.01)
*H04L 9/32* (2006.01)
*H04L 9/14* (2006.01)
*G06F 12/14* (2006.01)
*G06F 8/41* (2018.01)
*G06F 8/60* (2018.01)

(52) U.S. Cl.
CPC ............ *G06F 21/57* (2013.01); *G06F 21/602* (2013.01); *H04L 9/0819* (2013.01); *H04L 9/14* (2013.01); *H04L 9/3247* (2013.01); *G06F 8/41* (2013.01); *G06F 8/60* (2013.01); *G06F 2221/033* (2013.01); *G06F 2221/2101* (2013.01)

(58) Field of Classification Search
CPC .......... G06F 21/57; G06F 21/602; G06F 8/41; G06F 8/60; G06F 2221/033; G06F 2221/2101; H04L 9/0819; H04L 9/14; H04L 9/3247
See application file for complete search history.

(56) References Cited

U.S. PATENT DOCUMENTS

| 8,245,285 | B1* | 8/2012 | Ravishankar | G06F 21/77 726/9 |
| 9,361,595 | B2* | 6/2016 | Karve | G06Q 10/06315 |
| 9,389,898 | B2 | 7/2016 | Barak et al. | |
| 9,495,544 | B2 | 11/2016 | Aissi et al. | |
| 9,819,535 | B2* | 11/2017 | Stern | H04L 41/0631 |
| 9,934,052 | B1* | 4/2018 | Jin | G06F 9/45533 |
| 10,019,255 | B1* | 7/2018 | Greenfield | G06F 8/65 |
| 10,021,144 | B2* | 7/2018 | Bergeson | H04L 63/105 |
| 10,171,383 | B2* | 1/2019 | Johnston | H04L 67/10 |

(Continued)

OTHER PUBLICATIONS

AWS, "Amazon Elastic Container Registry features", Retrieved from https://aws.amazon.com/ecr/features/, Jul. 17, 2019, 6 pages.

(Continued)

*Primary Examiner* — Gary S Gracia
(74) *Attorney, Agent, or Firm* — Robert C. Kowert; Kowert, Hood, Munyon, Rankin & Goetzel, P.C.

(57) ABSTRACT

An executable version of an application is deployed at a dynamically provisioned execution resource. An encryption key, based at least partly on an analysis of the execution resource, is transmitted to the execution resource after the application is instantiated. In response to a software verification request, which includes a security artifact, a verification response indicating that the software used for the application at the execution resource meets a trust criterion is provided. The security artifact is generated using the encryption key, and the verification response is based on analysis of the security artifact.

20 Claims, 11 Drawing Sheets

(56) References Cited

U.S. PATENT DOCUMENTS

| | | | |
|---|---|---|---|
| 10,176,095 B2 | 1/2019 | Ferguson et al. | |
| 10,205,771 B2* | 2/2019 | Palavalli | H04L 41/5054 |
| 10,511,675 B1* | 12/2019 | Chud | H04L 67/52 |
| 10,769,212 B2* | 9/2020 | Kenchammana-Hosekote | G06F 16/20 |
| 11,159,404 B1* | 10/2021 | Kuo | H04L 67/1008 |
| 11,163,669 B1* | 11/2021 | Torun | G06F 8/65 |
| 2012/0266231 A1* | 10/2012 | Spiers | H04L 9/3234 |
| | | | 726/12 |
| 2016/0352779 A1* | 12/2016 | Bergeson | H04L 63/0428 |
| 2016/0357988 A1* | 12/2016 | Ferguson | G06F 12/08 |
| 2017/0093700 A1* | 3/2017 | Gilley | H04L 69/08 |
| 2017/0230336 A1* | 8/2017 | Bingham | H04L 63/1491 |
| 2017/0310745 A1* | 10/2017 | Kim | H04L 67/51 |
| 2017/0346706 A1* | 11/2017 | Sanders | H04L 41/5054 |
| 2018/0183578 A1* | 6/2018 | Chakrabarti | H04L 9/0861 |
| 2018/0341762 A1* | 11/2018 | Gravenites | G06F 21/62 |
| 2019/0286812 A1* | 9/2019 | Lounsberry | H04L 9/0891 |
| 2019/0303187 A1* | 10/2019 | Vu | G06F 9/45558 |
| 2020/0007529 A1* | 1/2020 | Bahrenburg | G06F 16/95 |

OTHER PUBLICATIONS

AWS, "AWS CodeDeploy features", Retrieved from https://aws.amazon.com/codedeploy/features/?nc=sn&loc=2, Jul. 19, 2019, 6 Pages.

AWS, "AWS CodePipeline features", Retrieved from https://aws.amazon.com/codepipeline/features/?nc=sn&loc=2, Jul. 19, 2019, 5 Pages.

AWS, "AWS Lambda Features", Retrieved from https://aws.amazon.com/lambda/features/, Jul. 19, 2019, 7 Pages.

AWS, "AWS Key Management Service features", Retrieved from https://aws.amazon.com/kms/features/, Jul. 19, 2019, 9 Pages.

Wikipedia, Personal data, Retrieved from https://en.wikipedia.org/wiki/Personal_data, Jul. 17, 2019, 12 Pages.

* cited by examiner

SOFTWARE VERIFICATION FOR NETWORK-ACCESSIBLE APPLICATIONS

BACKGROUND

In recent years, more and more computing applications are being run in execution environments in which application requests are transferred over network connections to servers at which the applications are run. In many cases, such applications are implemented at provider networks or cloud-based resource environments. A provider network may enable some clients to acquire resources, such as virtual and/or physical computing devices, storage devices, and the like via easy-to-use programmatic interfaces, and run applications using combinations of the resources, with the provider network providing desired levels of scalability, availability, fault resilience and the like. The physical machines of the provider network may be distributed among numerous data centers in different cities, states or countries, in some cases enabling clients anywhere in the world to utilize a near-inexhaustible pool of resources.

A number of techniques, including TLS (Transport Layer Security), IPSec (Internet Protocol Security) and other protocols at various layers of the networking software/hardware stack have been developed to provide reassurance with respect to the connections used to access the application provider's resources—i.e., to answer the equivalents of the end-user questions "Is the data contained in my service request vulnerable to attack during its transmission to its destination?" or "Is the identity of organization with which I am communicating verifiable?". Software libraries that implement popular security protocols are included in most operating systems, and application developers often rely on using such libraries. To prevent malicious entities from breaching the security of data transfers, sophisticated encryption algorithms compatible with the standard protocols may be employed.

Unfortunately, the use of such libraries and protocols is sometimes insufficient to protect against potential misuse of data after it reaches its destination. For example, an end user may typically have to assume that a particular application, being accessed over a network, is going to use the information contained in the service requests for legitimate purposes only. With concerns increasing recently regarding data misuse, privacy breaches and the like, the problem of verifying that a remotely-executed application is trustworthy (the equivalent of answering the question "Is the application to which I am sending service requests trustworthy with respect to protecting my data?") remains challenging.

Figure 1:
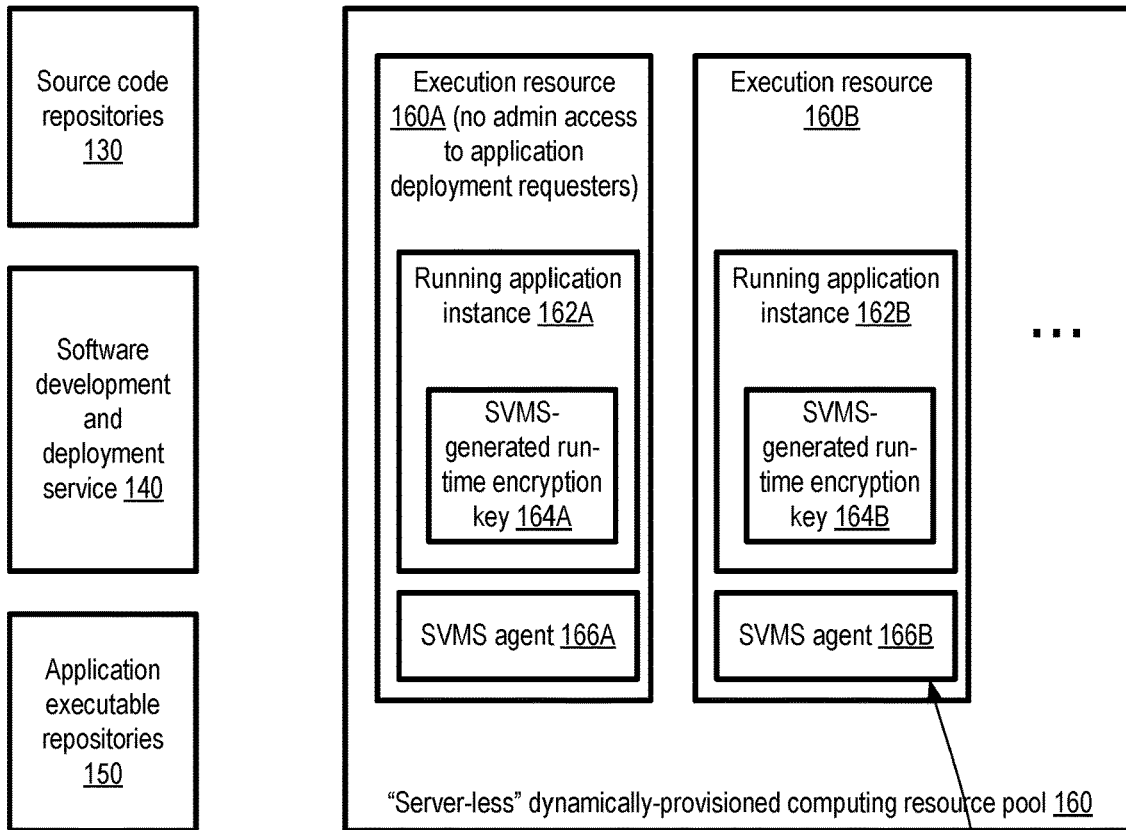
FIG. 1 illustrates an example system environment in a software verification management service for applications to which requests are transmitted over a network may be implemented, according to at least some embodiments.
Figure 1:
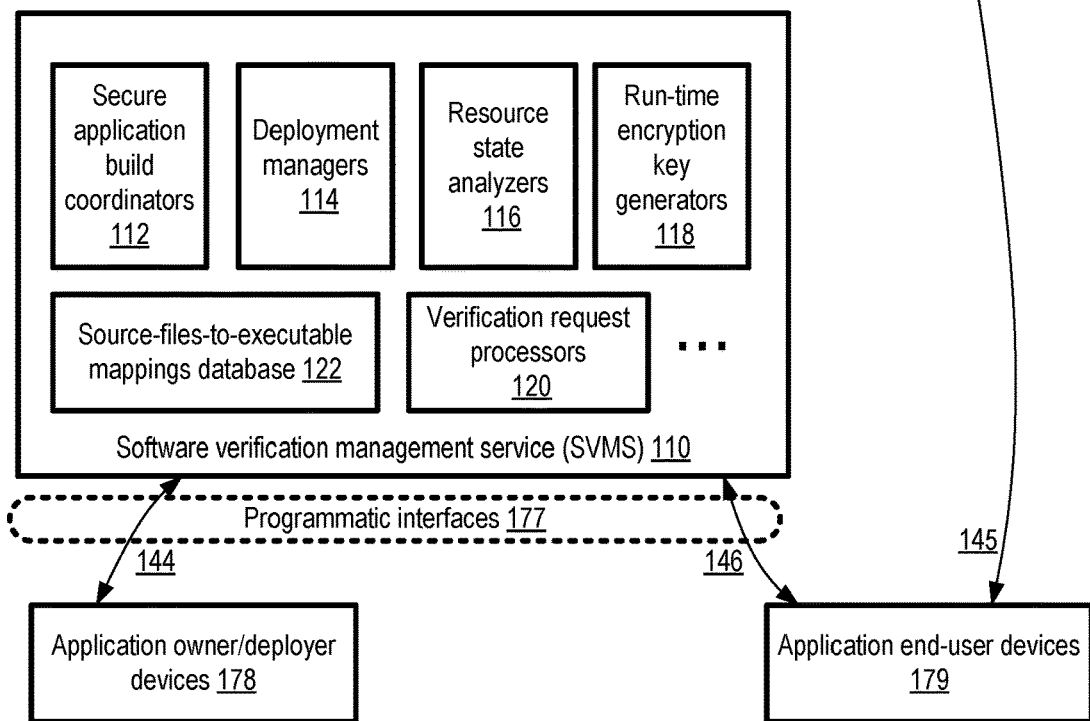

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for managing the build, deployment and execution of applications to be accessed via network requests in such a way that reliable evidence of the trustworthiness of the application software that is being run can be provided to end users or other interested parties. In at least some embodiments, a software verification management service (SVMS) may be employed on behalf of at least two types of customers. The first type of customer may comprise application owners or deployment requesters, on whose behalf executable application artifacts are generated from a collection of software source code using a cryptographically verifiable and auditable build process, and then deployed to secure execution resource. The second type of customer may include application end users, on whose behalf security artifacts, generated by the applications at run-time, may be automatically submitted to the SVMS to verify the software stack used for the running applications. In some embodiments, the SVMS may provide programmatic interfaces that allow an end user to view or browse the source code that corresponds precisely and verifiably to the application being run at a remote execution resource on the end user's behalf, so that the end user can (if desired) inspect the source code to gain confidence that the source code is not performing undesired operations. A number of different types of operations may be orchestrated by components of the SVMS during various stages of the lifecycle of an application, from the source code submission stage through the testing, building, deployment and execution stages, to enable the trustworthiness of application software to be verified. In some cases, the SVMS may be implemented using the resources of a provider network or cloud-computing environment, and the SVMS may in turn utilize other services of the provider network to implement some of these types of operations.

As one skilled in the art will appreciate in light of this disclosure, certain embodiments may be capable of achieving various advantages and practical applications/benefits, including some or all of the following: (a) significantly reducing the probability of data leakage or misuse which may otherwise be possible due to the deployment of unverifiable versions of applications accessed over a network, or due to back-door infiltrations of source code repositories or build procedures, (b) enhancing the user experience of application owners/designers, by providing easy to use interfaces that can be used to request secure building and deployment of the applications, without requiring the application owners or designers to be concerned about provisioning resources for the applications, and/or (c) reducing the amount of computing resources (such as processors, memory and the like) that may have to be devoted, e.g., during debugging sessions and the like, to ascertaining the versions of application source code files whose executable versions have been deployed, by providing cryptographic strength evidence tying the deployed versions to specific collections of source code.

According to at least some embodiments, a system may include one or more computing devices, e.g., collectively comprising some combination of hardware and software used to implement components of a software verification management service (SVMS). The computing devices may include instructions that upon execution on or across one or more processors obtain an indication of a collection of source code of a network-accessible application to be deployed at a dynamically provisioned execution resource, e.g., at a virtualized or physical host of a computing service of a provider network. Such a computing service may be referred to in some embodiments as a "server-less" computing service, as details regarding the specific computing capabilities, locations and/or other properties of the servers at which computing tasks are performed on behalf of service clients may not be revealed to the clients. Instead, at such services, when a request to execute a specified application or program is received from a client, in various embodiments an execution resource (e.g., a physical un-virtualized hardware server, or a virtual machine) may be identified dynamically for the request, the executable software to be used for the application or program may be deployed or transferred to the selected execution resource, and the application or program may be run at the selected resource without allocating the resource to the client. In some cases, the client requesting the deployment may not necessarily be provided administrative access to the execution resource used for the application; instead, to the client, the application may appear to be running in a "black-box" environment.

The SVMS may be responsible for causing an executable version of the network-accessible application to be generated, e.g., using the collection of source code as input to an audited, cryptographically verifiable build procedure or pipeline in various embodiments. In at least one embodiment, respective immutable audit records may be stored to indicate one or more operations performed during the build procedure—e.g., timestamped results of testing performed at one stage of the procedure may be stored in a log-structured write-once database, a timestamped record indicating any changes introduced for fixing detected bugs in the source code may be stored in the log-structured write-once database, and so on. In at least some embodiments, the audit records may be generated using cryptographic algorithms, e.g., each record may include a digital signature generated using a private key associated with the collection of source code, and the digital signatures may be usable to verify the authenticity of the records. Any of several different types of executable artifacts may be generated for the application in different embodiments, such as a software container image, an archive or zip file formatted according to a specification of a dynamically provisioned computing service, a file with a file name extension (e.g., ".exe") or file permission setting (e.g., containing an "x" in a Linux-style file permission string) indicating the file is executable, and the like. After the executable version of the application has been generated using the verifiable and auditable procedure, in at least some embodiments a unique identifier (such as a universally-unique identifier or UUID, which may include a long alphanumeric string incorporating a timestamp and/or a random number) may be generated for the executable version. In various embodiments, a database record indicating a mapping between the collection of source code files and the executable version of the application may be stored, e.g., by an SVMS component, so that it becomes possible to identify the source code given the application identifier, and to identify the application identifier given the source code. In at least one embodiment, as part of one of the final stages of the build procedure, the executable version may be stored in a repository (e.g., a container repository maintained at another provider network service), and the identifier selected for the executable version may be based at least in part on a logical or physical location within the repository at which the executable version is stored.

After the executable version of the application is created and stored, the SVMS may be in a position to deploy the executable version of the application, e.g., on behalf of an application owner or designer. According to at least one embodiment, in response to a deployment request received via a programmatic interface, the SVMS may cause the executable version to be deployed at an execution resource of a dynamically provisioned ("server-less") computing service of the kind mentioned above. As mentioned earlier, at least in some embodiments, administrative access to the execution resource may not be provided to the submitter of the deployment request, or to any other user or entity other than the SVMS components on whose behalf the execution resource is selected. The executable version of the application may then be started up or run at the selected execution resource, and may begin its operations with an initialization phase in which one or more processes or threads are started in some embodiments. Any of a variety of types of execution resources may be used in different embodiments, such as virtual machines, physical (un-virtualized) servers, or the like. In at least one embodiment, multiple virtual machines or compute instances set up at a given virtualization host may be used as respective execution resources for different applications. In some embodiments, a given execution resource may be used in multi-tenant mode to run multiple applications on behalf of respective SVMS clients.

In at least one embodiment, upon starting up, and before any application requests are received or serviced, a process or thread of the application (which was launched via the deployed executable version of the application) may be configured to automatically submit a programmatic key request to the SVMS from the execution resource. In some embodiments, such a key request may include or encode one or more of the following types of data: (a) the identifier (e.g., the UUID) of the executable version of the application, (b) an identifier of the execution resource (e.g., a host identifier, a network address, a virtual machine or compute instance identifier, and so on), (c) an identifier of the submitter of the deployment request which led to the deployment of the executable version at the resource and/or (d) one or more timestamps (such as a timestamp indicating when the deployment was requested or when the deployment succeeded, or a timestamp indicating when the key request itself was generated).

In response to receiving such a key request during the initialization of the application at the execution resource, the SVMS may initiate a number of operations to ascertain various properties of the software installed at the execution resource. State information of the resource may be obtained in some cases from local log records generated and stored at the resource itself (e.g., indicating the timestamp at which the application executable was deployed, a boot timestamp of the execution resource, etc.), from log records stored elsewhere (e.g., by an SVMS agent which initiated the deployment), from inventory records (e.g., indicating the identifier of the execution resource and the operating system/hypervisor versions running at the resource), and/or from responses sent to an SVMS monitoring agent running at the resource. Based at least in part on the results of the analysis of the state information, as well as analysis of the key request contents, an encryption key may be generated and provided to the running application instance (e.g., in a message sent to the process/thread from which the key request was received) in various embodiments. Keys of different lengths (e.g., 128 bits, 256 bits, etc.) may be generated in different embodiments, using any of a plurality of cryptographic algorithms. The run-time encryption key may in effect represent evidence that the SVMS has verified that the software running on the execution resource matches the software source code collection which was used to build the executable version, and is thus trustworthy.

Such evidence of trust may also be provided to application end users as follows in at least some embodiments. When an application service request is received at the execution resource from a client device (e.g., a laptop, mobile computing device or the like) of an end user, a response to the service request may be generated by the running instance of the application. The response may comprise a data payload of application-specific information, such as a result of a query indicated in the application request, a result of a computation, a document requested by the end user, etc. In addition to the data payload itself, a security artifact generated using the encryption key (such as a digital signature of at least a portion of the data payload) may be included in the response message provided to the end user in various embodiments. In embodiments in which the security artifact is based at least partly on the specific response contents, the security artifacts generate and included in different response messages may consequently differ from one another—e.g., the security artifact SA1 included in response Resp1 to request Req1 may differ from the security artifact SA2 included in response Resp2 to request Req2, although both artifacts may be generated using the same encryption key. In at least one embodiment, security artifacts may not necessarily be included in all response messages—e.g., a security artifact may be included in one of every N response messages, in at least P responses per minute, or according to some other artifact inclusion scheduling algorithm. Note that in at least some embodiments, any of various security protocols, such as TLS (Transport Layer Security), ssh (secure shell), or the like, which may involve the use of additional cryptographic keys, may be employed to secure the communication between the end user's client device and the execution resource. The use of such security protocols may be considered orthogonal to the techniques described herein for verifying the software stack being used at the execution resource; the encryption keys used for the security of the communications may not be used for software verification in at least some embodiments.

At the client device, the security artifact generated by the application using the encryption key, and incorporated within the response to the application service request, may be extracted in various embodiments. In at least some embodiments, the security artifact may be automatically transmitted to the SVMS as part of a software verification request, e.g., by a component of a client-side program (such as a browser or a graphical user interface) being employed by the end user. The software verification request may be considered an "out-of-band" communication, as it is not part of the messaging associated with application requests and responses. In at least one embodiment, the SVMS may transmit an extension or plug-in to be incorporated within a client-side software program (such as a browser) used to submit application service requests and receive corresponding responses, and such an extension or plug-in may be responsible for sending software verification requests to the SVMS.

Upon receiving such a software verification request, the SVMS may analyze the security artifact, and (if the security artifact meets one or more criteria, such as confirming that the artifact was generated using the encryption key that was previously provided by the SVMS) generate and transmit a verification response in various embodiments, indicating that software used to implement the application at the execution resource corresponds to the collection of source code obtained at the SVMS. As such, the SVMS may be able to use the security artifact to validate the trustworthiness of the software being used for the running application, and provide an indication of the trustworthiness to the end user in such embodiments. In some implementations, the verification response may simply provide an affirmation indicating that the SVMS has confirmed the legitimacy of the software being run on behalf of the end user at the execution resource (e.g., a message logically equivalent to "Software verified successfully"). In other implementations, more details about the verification (e.g., indications of when the build of the executable completed, when it was deployed, authors/contributors to the build, etc.) and/or access to the source code may be provided in the verification response. In one such implementation, a pointer to a source code repository, accessible over the Internet, at which the collection of source code used for the deployed version of the application is stored may be provided. Such a pointer (e.g., a web link) may be used, if desired, by an end user to access and examine the source code, and thereby obtain additional assurances regarding the legitimacy of the application. According to some embodiments, some end users may share the results of their analysis of the source code with other end users. For example, a message may be sent via a programmatic interface to the SVMS by a client or end user indicating that at least a portion of the source code has been examined by the client or end user. The SVMS may store records of such messages, and enable other clients or end users to view the records via additional programmatic interfaces (e.g., a comments-sharing interface or reviewing interface). In effect, the equivalent of an online forum may be provided by the SVMS, in which different users may share the results of their examination of application source code running at a given set of execution resources.

In at least some embodiments, a deployment request for the executable version of the application may be accompanied by an indication of an expected/estimated workload level of the application, and the SVMS may determine the number of execution resources to which the application should be deployed based on the workload estimate and the computing capacity of individual execution resources. In some cases, the deployment request may indicate that the application is to be deployed to some specified number of execution resources to handle the expected workload. In these types of scenarios, in which either a workload estimate or a desired number of execution resources is indicated with respect to a deployment request, respective copies of the executable version of the application may be deployed to each of several execution resources by the SVMS. In at least some embodiments, different encryption keys may be generated for each of the execution resources (e.g., in response to respective key requests received from the application instances running at the respective resources). For example, if two compute instances or virtual machines CI1 and CI2, running at the same virtualization host configured in multi-tenant mode, are used as execution resources for two instances of the same application (or for respective instances of different applications), distinct encryption keys K1 and K2 may be provided to CI1 and CI2. Similarly, if two separate hosts H1 and H2 are used as execution resources for two instances of the same application (or for respective instances of different applications), distinct encryption keys may be transmitted from the SVMS to H1 and H2.

Example System Environment

FIG. 1 illustrates an example system environment in a software verification management service for applications to which requests are transmitted over a network may be implemented, according to at least some embodiments. As shown, system 100 comprises various resources of a software verification management service (SVMS) 110, one or more source code repositories 130, a software development and deployment service 140, one or more application executable repositories 150, and a "server-less" dynamically-provisioned pool 160 of computing resources. The SVMS 110 may include, among other subcomponents, one or more secure application build coordinators 112, deployment managers 114, resource state analyzers 116, run-time encryption key generators 118, verification request processors 120, as well as a database 122 of mappings between source code file collections and application executables in the depicted embodiment. Individual ones of the SVMS components shown in FIG. 1 may be implemented using a combination of hardware and software of one or more computing devices.

The SVMS may implement a set of programmatic interfaces 177 in the depicted embodiment, which may be used by or on behalf of at least two categories of SVMS clients—application owners or deployers, as well as end users of the applications. Programmatic interfaces 177 may include, for example, one or more web-based consoles, a set of application programming interfaces (APIs), command line tools, graphical user interfaces or the like in different embodiments. The interfaces 177 may be used to transmit requests pertaining to secure application build, deployment, execution and software verification by the SVMS clients from a variety of client devices (e.g., laptops, desktops, mobile computing devices, phones, etc.), including application owner/deployer devices 178 and end-user devices 179, as indicated by arrows 144 and 146. In some embodiments, the interfaces 177 may also be used to receive corresponding responses from the SVMS.

In at least some embodiments, an application owner may submit a request to generate an application executable to the SVMS via a programmatic interface 177, indicating a collection of the application's source code files stored in a repository 130. The request may also indicate that the application, once built, is to be deployed at one or more dynamically provisioned execution resources (e.g., selected from resource pool 160 by the SVMS)—that is, the application owner may rely on the SVMS to make decisions regarding deployment destinations of the application.

In response to such an application executable generation request, in at least some embodiments, one or more components of the SVMS 110, such as a secure application build coordinator 112, may initiate a cryptographically verifiable and audited build procedure. In such a procedure, which may in some embodiments involve executing various stages of a pipeline using a software development and deployment service 140, respective audit records may be generated and stored as each operation or step of the procedure (e.g., source code ingestion, testing of various types, bug fixing, etc.) is performed, thereby providing a complete and transparent record of the procedure, including any changes introduced into the source code collection during the procedure. In at least one embodiment, the audit records may be immutable, e.g., they may be appended to a write-once or log-structured storage object. In some embodiments, the audit records may include cryptographic artifacts, such as checksums of the source code or test results, which can be used to verify the authenticity of the audited information.

At the end of the cryptographically verifiable build procedure, an executable version of the application corresponding to the source code collection may be obtained and stored at an application executable repository 150 in the depicted embodiment, e.g., at the request of a build coordinator 112, and a unique identifier (e.g., a UUID) may be generated for the application executable. In some embodiments, the unique identifier may be based at least in part on a specific logical or physical location or address at which the executable is stored in the repository 150, so that it becomes possible to use the identifier to correlate operations performed at the repository (e.g. executable retrieval requests, executable transfer requests etc.) with the source code that was used to generate the executable on which the operations are performed. According to at least some embodiments, a record may be stored, e.g., in database 122 of the SVMS, indicating a mapping between the collection of source code that was used for generating the executable version of the application, and the identifier assigned to the executable version. The identifier may be provided to the application owner via programmatic interface 177 in some embodiments.

In some embodiments, an application owner/deployer may submit a deployment request via a programmatic interface 177, indicating a particular application (e.g., by providing the identifier of the executable version) to be deployed. In response, a deployment manager 114 of the SVMS 110 may cause the executable version of the application to be deployed at one or more execution resources 160 (such as 160A or 160B) of the resource pool 160. In some embodiments, the resource pool 160 may be maintained and managed by a dynamically-provisioned computing service, and the deployment manager may utilize programmatic interfaces of such a service to deploy the executable version of the executable. Note that at least in some embodiments, administrative access (or even login access as a non-administrative user) may not be provided to the submitter of the deployment request, or to any end users of the application. In effect, an execution resource 160 may represent the equivalent of a "black box" to the clients of the SVMS, with the configuration details of the resource hidden from the clients. In some embodiments, individual ones of the execution resources 160 (which may for example comprise virtual machines, un-virtualized servers or the like) may comprise a respective SVMS agent 166 (e.g., agent 166A or 166B) which can be used by the SVMS to obtain state information, metrics and the like from the execution resources, and/or to make SVMS-initiated configuration changes at the resources.

After the executable version of the application has been deployed to a given execution resource 160, an instance 162 (e.g., instance 162A or 162B) of the application may be launched at the resource. The running instance may, for example, comprise one or more software processes or threads of execution. In at least some embodiments, during an initialization phase of one such process or thread, an encryption key request may be generated and transmitted to the SVMS from the resource 160 via a programmatic request. The key request may indicate one or more properties of the running instance 162; for example, it may include respective indications of one or more of (a) the identifier of the executable version of the application that was used to launch the running instance, (b) an identifier of the execution resource itself and/or (c) an identifier of a submitter of the deployment request that resulted in the deployment of the application executable to the execution resource. In some implementations the key request may include one or more timestamps, e.g., indicating the time at which the executable version was deployed.

The encryption key request may trigger a verification of the state of the execution resource by the SVMS (e.g., by a resource state analyzer 116) in various embodiments. The resource state analyzer 116 may perform a number of different types of actions to examine the state of the execution resource, such as analyzing the contents of the key request itself, various local log entries of the execution resource itself, remotely store log entries (e.g., log entries generated by the deployment manager's deployment request earlier), and/or responses to queries directed to the SVMS agent 166 at the execution resource. If a determination is made that the execution resource's software and/or hardware state meets one or more criteria, the state analyzer 116 may in turn trigger the generation of an encryption key that is unique to the running instance 162. In some embodiments, a run-time encryption key generator 118 of the SVMS may utilize one or more external resources, such as a key management service, to generate the key; in other embodiments, such external resources may not be employed. The key 164 (e.g., 164A or 164B) may be transmitted to the execution resource, and stored therein, in various embodiments. Note that if the resource state analyzer determines that the execution resource or the application instance does not meet one or more acceptance criteria (e.g., if the application executable used for the running instance does not match the application executable for which a deployment request was generated, or if a timestamp of the deployment does not correspond to a timestamp of a deployment request in one of the logs examined by the state analyzer), the key may not be provided and the application instance may be terminated in at least some embodiments.

After the encryption key is received, the application instance 162 may begin servicing application requests submitted by end users (indicated by arrow 145 in FIG. 1). In at least some embodiments, the encryption key 164 may be used by the application instance 162 to generate security artifacts or tokens to be incorporated within responses to such application requests. The security tokens or artifacts may in effect serve as evidence (which can be provided to end users) of the trustworthiness of the application instance in some embodiments, e.g., to indicate that the software running at an execution resource corresponds to a set of source code that can be accessed by an application end user. In some embodiments, when an application service request is received, the data payload (e.g., a result of a query indicated in the request, or a result of a computation performed on behalf of the application request submitter) of a response may be prepared at the application instance, and then a security artifact may be generated using the encryption key 164 and at least a portion of the data payload. The security artifact may be incorporated within the response message, e.g., as a header in some embodiments, and sent to the application request submitter.

At the application end-user device 179, the security artifact may be extracted from the response and included in a software verification request submitted to the SVMS 110 in some embodiments. A verification request processor 120 of the SVMS may examine the security artifact and various metadata stored by the SVMS pertaining to the application executables and the execution resources (such as the source files to executable mappings database) in some embodiments, and generate a verification response indicating the trustworthiness of the application instance based on the results of its analysis. In at least one embodiment, for example, the verification response sent to the end user device 179 may indicate that the software used to implement the application at the execution resource corresponds to a particular collection of source code that can be examined, if desired, by the end user. As such, the end user may be provided access (e.g., via a web link included in the verification response) to the source code corresponding to the running instance of the application by the SVMS in such embodiments. In some cases, the end user may not necessarily wish to examine the source code, and may be satisfied by a trustworthiness message provided by the SVMS in the verification response (for example, the presence of a pointer to the source code in the verification response may itself serve as an adequate indication of trustworthiness of the application instance).

Example Auditable Software Build Pipeline

Figure 2:
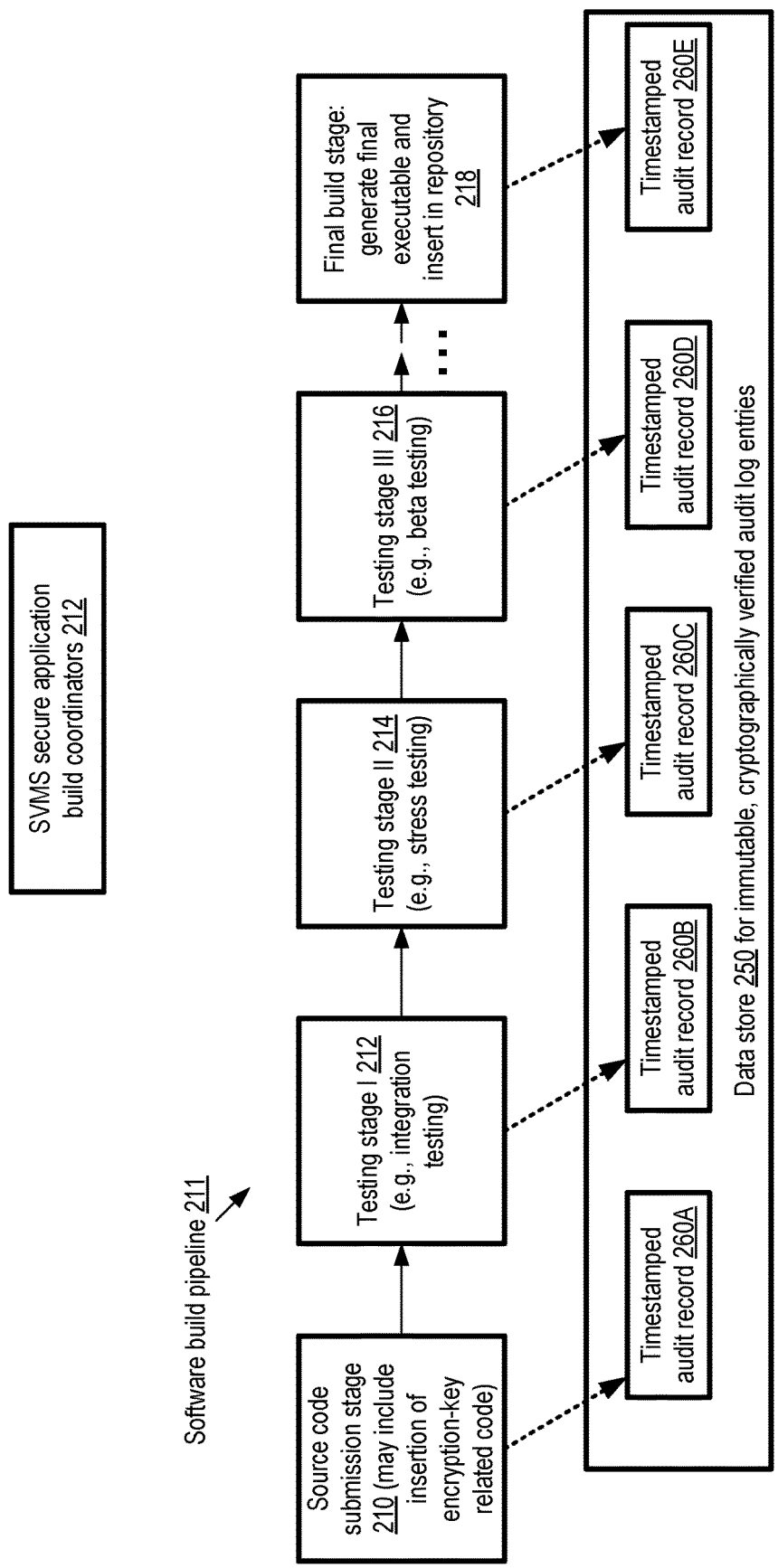
FIG. 2 illustrates an example auditable build pipeline which may be employed for applications for which software verification functionality is to be provided, according to at least some embodiments.

FIG. 2 illustrates an example auditable build pipeline which may be employed for applications for which software verification functionality is to be provided, according to at least some embodiments. In the depicted example, pipeline 211, comprising at least five stages, may be executed to generate and store an executable version of an application or service which is to be accessed via a network from end user devices. In at least some embodiments, a secure application build coordinator 212 of a software verification management service, similar in functionality and features to SVMS 110 of FIG. 1, may cause the pipeline 211 to be executed on behalf of a client of an SVMS such as an application designer or application owner, e.g., at a software development and deployment service of a provider network. In at least one embodiment, the pipeline stages may be defined by the application owner, e.g., using a graphical interface, and a representation or identifier of the pipeline may be transmitted to the build coordinator 212 via a programmatic interface.

The pipeline 211 may comprise a source code submission stage 210, followed by several stages of testing and a final build stage 218 in the depicted embodiment. The testing stages may include an integration testing stage 212, a stress testing stage 214 and a beta testing stage 216, for example. In at least one embodiments, in addition to software source code pertaining to the business logic of the application, source code that sends an encryption key request to the SVMS during an initialization phase of the application at a deployment resource, and source code to receive and utilize the encryption key to generate security artifacts in application service responses may be included in the collection of source code processed using pipeline 211. The details of the specific operations to be performed at each stage may be provided by an application designer or owner in various embodiments—for example, the suites of tests to be run, the levels of workload to be used during stress testing, and a pool of beta testers may be indicated by the application designer or owner.

A data store 250 may be used to store immutable (write-once) cryptographically verified audit log entries representing various operations that are performed during the pipeline stages in the depicted embodiment. For example, time-stamped audit records 260A-260E, each signed using a cryptographic key selected for the application by the SVMS, may respectively be stored in the data store for operations performed in the stages 210, 212, 214, 216 and 218. The audit records may provide a complete history of the results obtained (if any) at the various stages of the pipeline, and may be usable to track any changes made to the original collection of source code before the executable version of the application is built. In some embodiments, as mentioned earlier, the SVMS may enable end users to view the source code corresponding to the application being run on the end users' behalf. In at least some embodiments in which the original source code of the application is modified (e.g., to resolve defects identified during the testing stages of the pipeline 211) the immutable audit records 260 may be used as evidence of the evolution of the source code during the execution of the pipeline. In some embodiments, end users of the application may also be provided access to at least some of the audit records stored at data store 250, e.g., in response to a software verification request of the kind discussed above.

Example Sequence of Interactions to Enable Application Software Verification

After an executable version of an application is generated and stored, e.g., using a pipeline similar to pipeline 211 of FIG. 2, it may be deployed and run to respond to various types of application requests. At least in some cases, end users of the application may wish to verify the trustworthiness of the running application's software. FIG. 3a-FIG. 3h collectively illustrate examples operations that may be performed to enable application software verification, according to at least some embodiments.

Figure 3A:
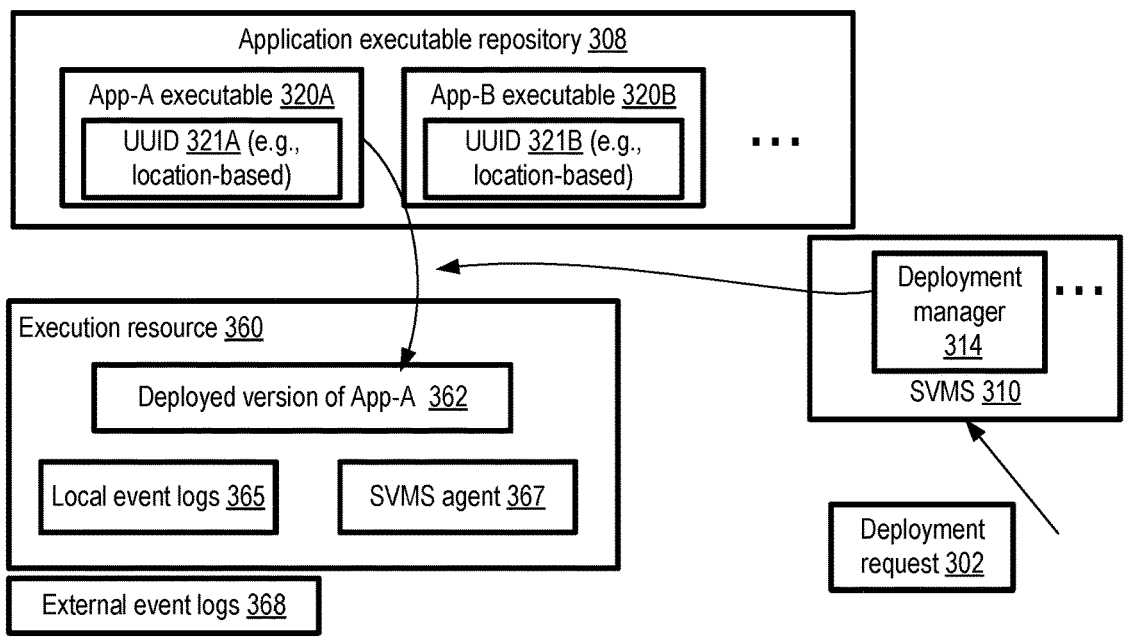
FIG. 3a-FIG. 3h collectively illustrate examples operations that may be performed to enable application software verification, according to at least some embodiments.

As shown in FIG. 3a, executable versions of a number of applications, such as App-A executable 320A and App-B executable 320B, may be stored within an executable repository 308. In at least some embodiments, each such executable may be assigned a universally-unique identifier (UUID) 321, such as 321A or 321B. In some implementations, the logical or physical location or address of the executable 320 may be incorporated within, or used to generate, the UUID, so that it becomes possible to determine the location or address of the executable from the UUID.

A deployment manager 314 of an SVMS 310, similar in features and functionality to SVMS 110 of FIG. 1, may cause App-A artifacts to be transmitted to and installed at a selected execution resource 360 in the depicted embodiment in response to a programmatic deployment request 302. In addition to the deployed version of App-A 362, the executable resource 360 may comprise an SVMS agent 367 used for administrative tasks requested by other SVMS components in some embodiments. Local event logs 365 comprising records of configuration-related operations may be stored at the execution resource 360. In addition, one or more external event logs 368 may also comprise records pertaining to the configuration of execution resource 360—e.g., such external logs may indicate the source and contents of the deployment request 302 and when it was received, the operating system version and hypervisor version (if any) installed on the execution resource 360, hardware details of the execution resource (such as the type of processor used, the amount of memory installed, etc.).

Figure 3B:
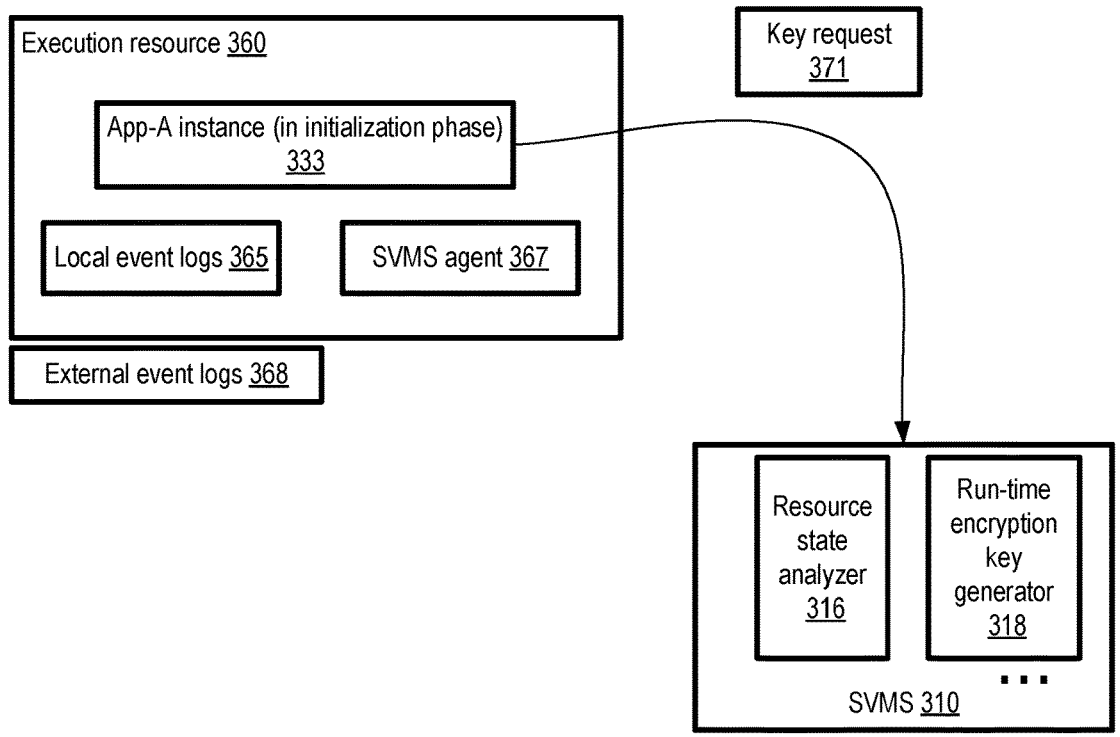

In the scenario depicted in FIG. 3b, the deployed version of App-A may be used to launch one or more software processes or threads of an App-A instance 333. During an initialization phase of the App-A instance, one such process or thread may transmit an encryption key request 371 to the SVMS 310. In at least some embodiments, code to cause such a key request to be generated, and to process the response received from the SVMS, may be added automatically to the baseline source code of the application as it passes through a pipeline similar to that shown in FIG. 2. The key request may include various parameters identifying App-A (e.g., the UUID 321A assigned to App-A), the execution resource 360, and/or the source of the deployment request 314.

Figure 3C:
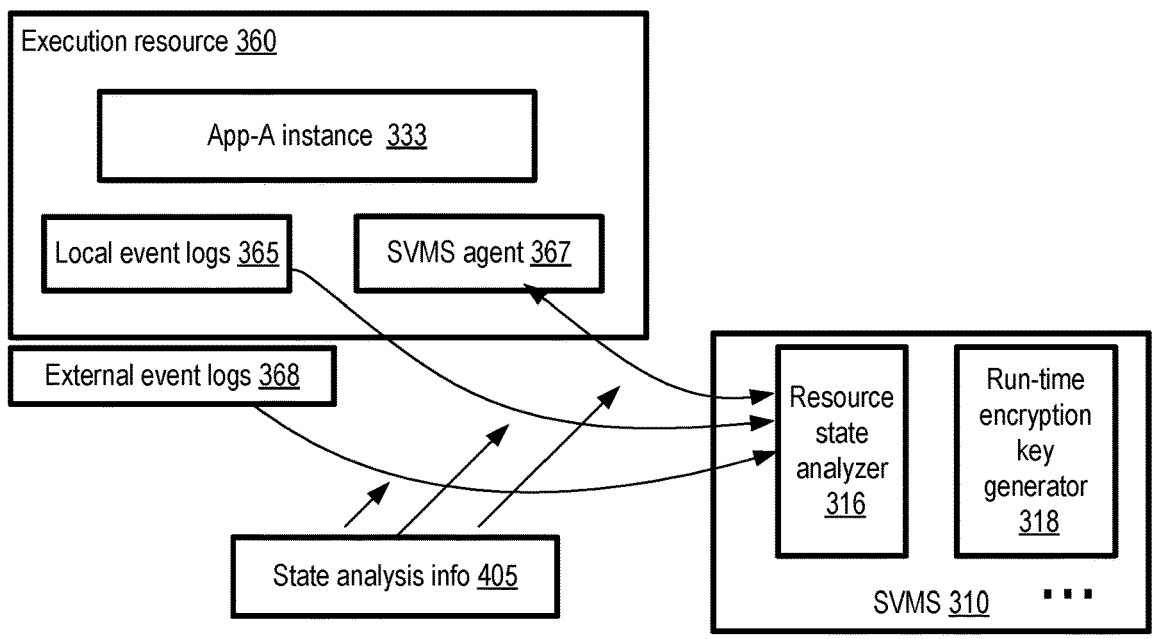

A resource state analyzer 316 of the SVMS may extract various elements of state information 405 of the execution resource 360 in response to receiving the key request 371 in some embodiments, as indicated in FIG. 3c. For example, the state analyzer may submit one or more queries (e.g., requesting information about the hardware and software installed at the resource 360, the set of processes running at the resource 360, and so on) to the SVMS agent 367 on the resource 360 and examine the results provided, analyze records stored at local event logs 365 and/or external event logs 368, and so on. The state analyzer may construct a representation of an expected configuration of the execution resource, and compare it to the actual configuration as discerned from the information 405 and the key request 371.

Figure 3D:
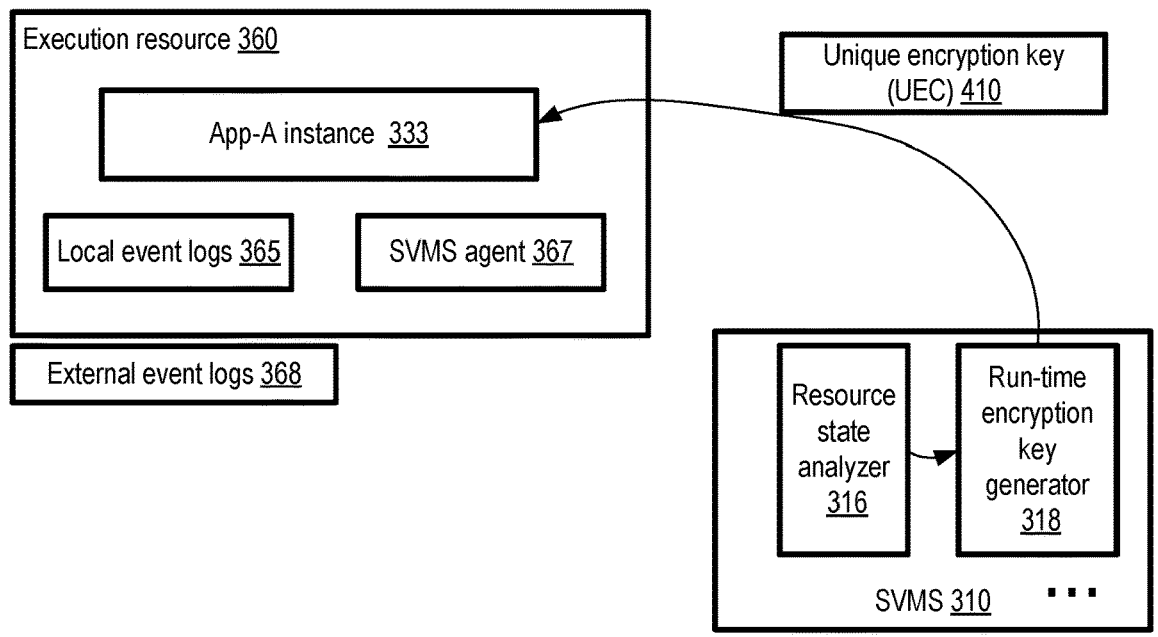

If the expected configuration matches the actual configuration, the resource state analyzer may send a message to a run-time encryption key generator 318 in the embodiment depicted in FIG. 3d, indicating that the App-A instance's software has been verified and that a key should be generated and provided to the App-A instance 333. In some embodiments, the key generator may use a key management service and/or other external resources to generate a unique encryption key (UEC) 410 which may be transmitted to App-A instance 333. In other embodiments, the key generator 318 may use a random-number generator and/or a hash function to generate the key locally without using external resources. By providing the UEC 410 to the App-A instance 333, the SVMS may in effect approve the configuration of App-A at the resource 360, and permit the instance 333 to start receiving and responding to application service requests in the depicted embodiment.

Figure 3E:
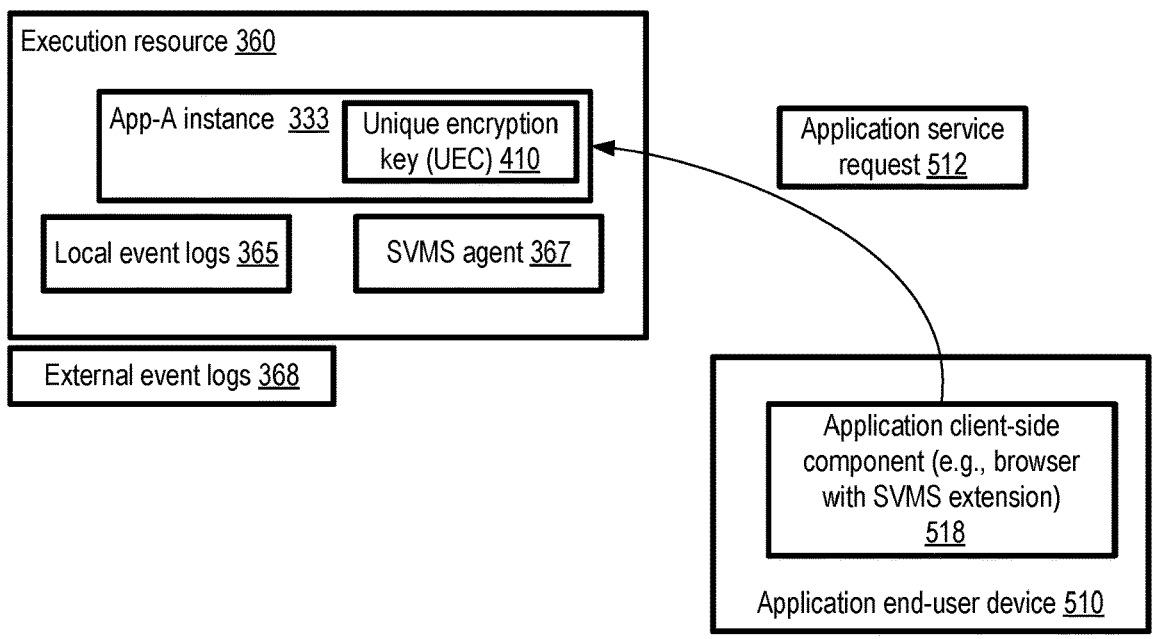

In the scenario depicted in FIG. 3e, a client-side component of the application App-A, such as a browser with an SVMS-provided extension or plugin, may be used to submit an application service request from an end-user's device 510 to the App-A instance 333 to which the unique encryption key 410 was provided. Any of a number of formats or protocols may be used to submit the application service request 512 in different embodiments, depending on the interfaces supported by App-A. In some embodiments, for example, a REST (representational state transfer) API may be used to submit the request. In one embodiment HTTP (HyperText Transfer Protocol) or HTTPs (secure HTTP) may be used, or other web-service request formats may be used. In at least one embodiment, in order to enable end users to access App-A, a URL (Uniform Resource Locator) (or other network endpoint information) which can be used to send requests to the running instance may be publicized or distributed by the owner of App-A. In order to fulfill the application service request 512, App-A instance 333 may have to perform some computations, retrieve some data objects from a data source, or perform other operations, depending on the logic of App-A, and identify a data payload to be returned to the client-side component at the end user device 510. App-A may implement any desired types of application logic in different embodiments—e.g., App-A may implement a database, a document sharing system, a media content management or creation system, a machine learning service, and so on.

Figure 3F:
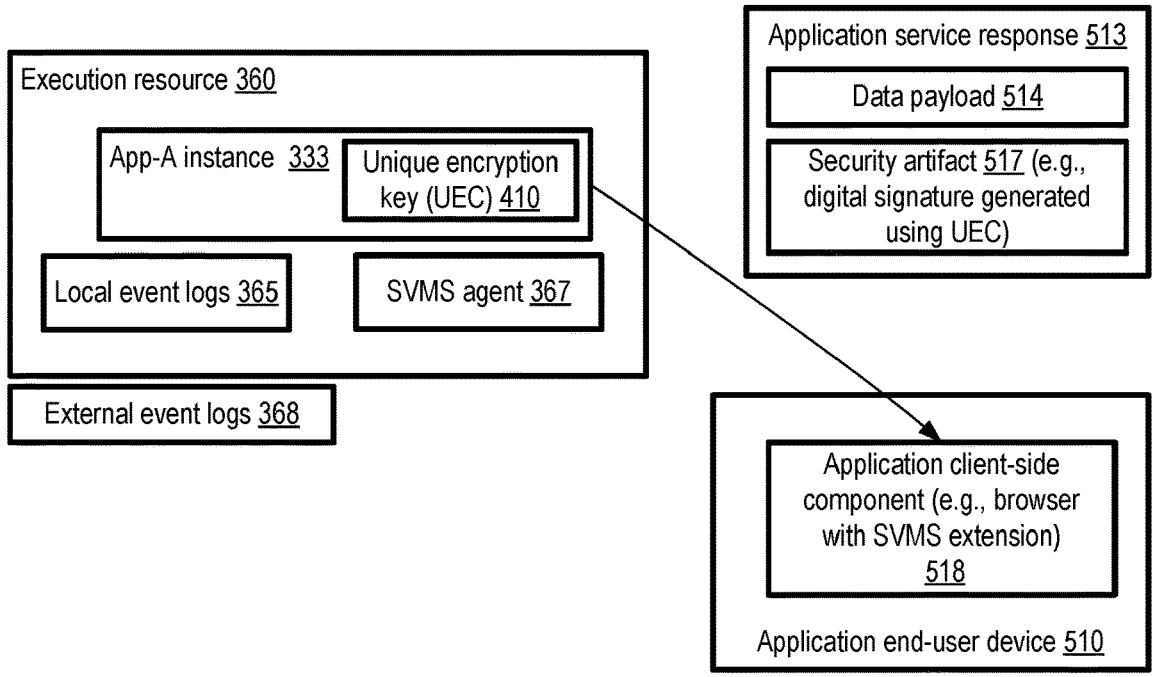

In FIG. 3f, an application service response 513 generated at App-A instance 333, corresponding to the request 512, is shown. In addition to the data payload 514 representing the results of the requested operations, the response 513 may include a security artifact 517 in various embodiments. The security artifact 517 may be generated using the UEC in at least some embodiments—e.g., a digital signature of at least a portion of the data payload 514 may be produced using the UEC 410 and used as the security artifact. In other embodiments, the artifact may not necessarily be generated from the data payload of the response, and may or may not comprise a signature.

Figure 3G:
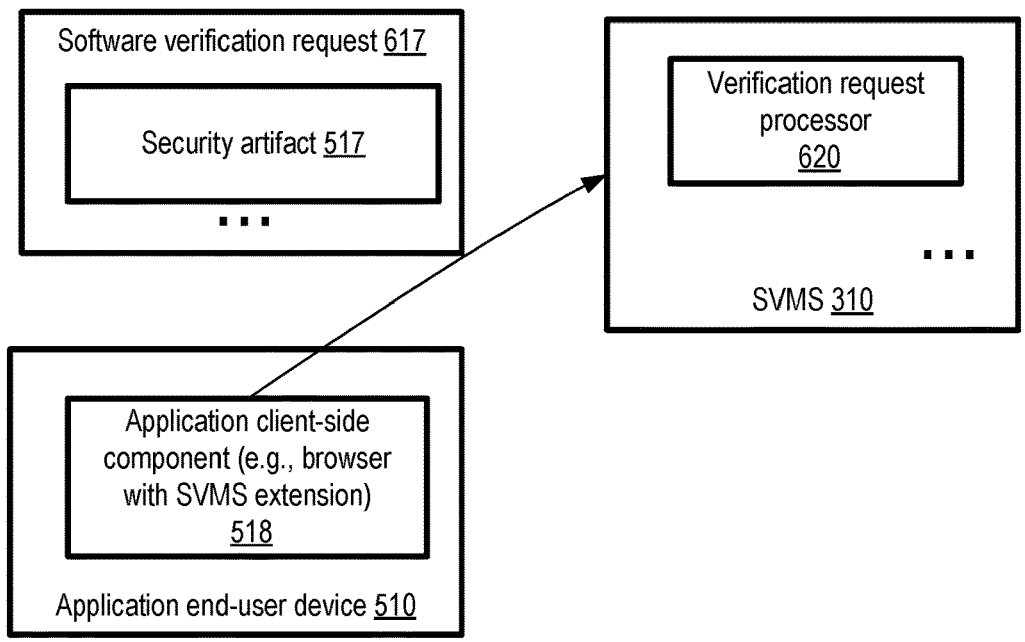

After the client-side component of the application receives the response, the security artifact 517 may be extracted from the response and included in a software verification request 617 sent to the SVMS 510, as shown in FIG. 3g. In one embodiment, the entire response 513 and/or the corresponding application service request 512 may be included in the software verification request 617, enabling the SVMS to in effect replicate some of the operations performed at the App-A instance 333 and verify that the results generated by the SVMS match those generated by App-A.

Figure 3H:
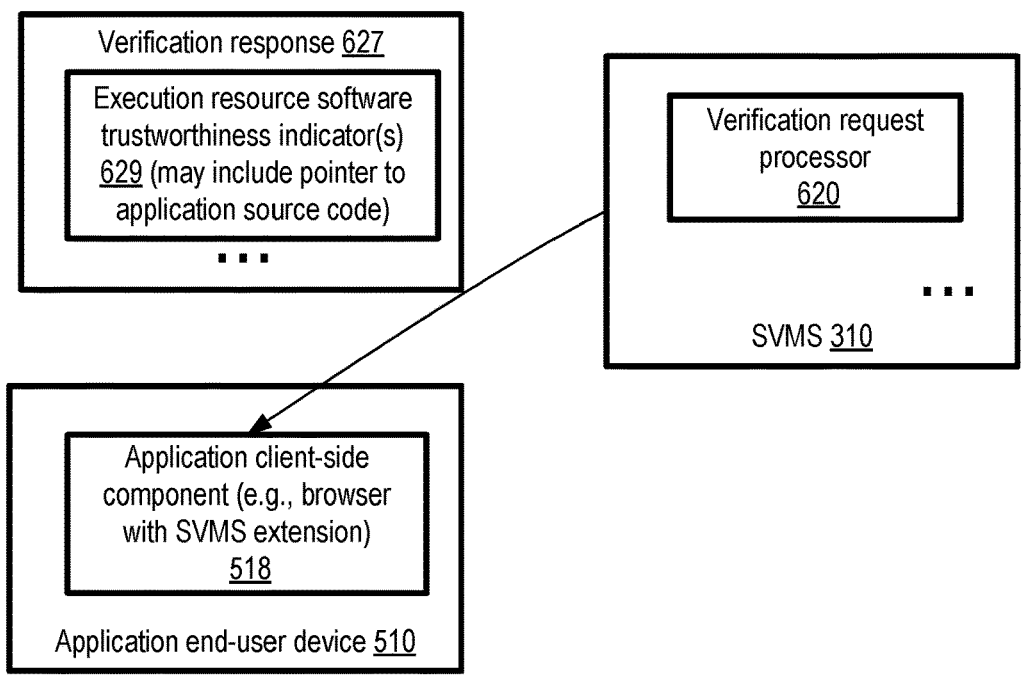

If the security artifact 517 meets one or more acceptance criteria of a verification request processor 620 of the SVMS 310, a verification response 627 comprising one or more trustworthiness indicators 629 of the execution resource software may be transmitted to the end-user device 510 in the depicted embodiment, as indicated in FIG. 3h. In some embodiments, the trustworthiness indicator may be as simple as a yes/no indicator, with a "yes" value indicating that the application instance's software has been verified as legitimate and a "no" value indicating that the application instance's software has not been verified as legitimate. In other embodiments, the trustworthiness indicator may include a pointer that can be used to access the actual source code that was used to generate the application deployed to the execution resource, and/or to access audit records pertaining to the testing and building of the software used for the application.

Example Programmatic Interactions

Figure 4:
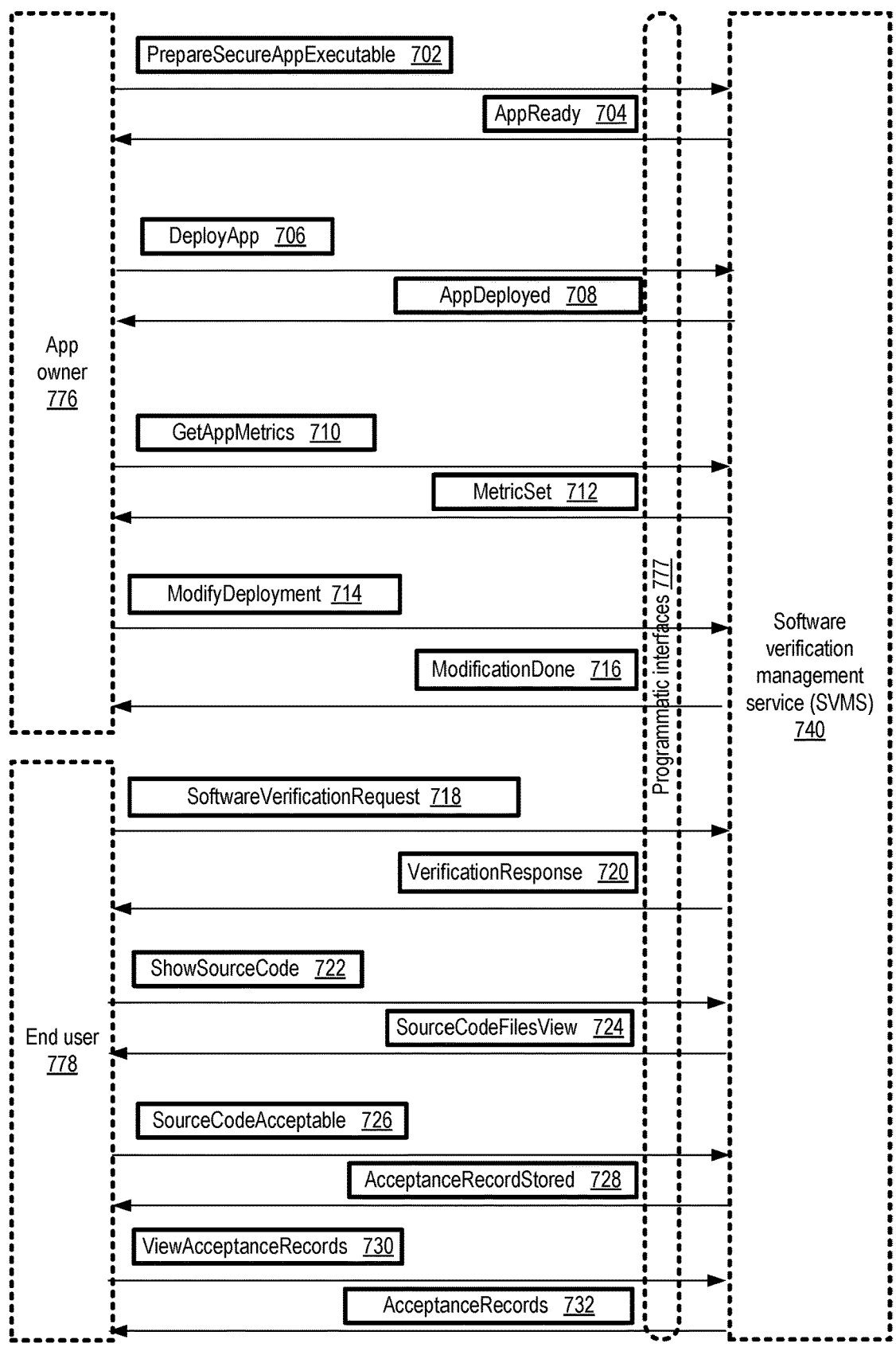
FIG. 4 illustrates example programmatic interactions with a software verification management service, according to at least some embodiments.

FIG. 4 illustrates example programmatic interactions with a software verification management service, according to at least some embodiments. In the depicted embodiment, any of several kinds of programmatic interfaces 777, such as a set of APIs, a command-line tool, a web-based console, and/or one or more graphical user interfaces may be implemented by a software verification management service (SVMS) 740 similar in features and functionality to SVMS 110 of FIG. 1. Subsets of the interfaces 777 may be used by application owners 776 and end users 778 to transmit various types of requests pertaining to application preparation and verification to the SVMS, and receive corresponding requests.

An application owner 776 may, for example, submit a PrepareSecureAppExecutable request 702, indicating a collection of source code and/or a pipeline to be implemented to generate an executable version of an application in the depicted embodiment. In response the SVMS 740 may initiate an auditable, cryptographically verifiable procedure, similar to that discussed in the context of FIG. 2, which eventually results in the creation and storage of an executable version of the application corresponding to the source code. After the executable version is generated and stored, an AppReady response 704 may be sent to the application owner, indicating that the application is ready for deployment. Note that in some cases it may take a non-trivial amount of time (e.g., hours, or even days) to complete the pipeline stages, so the AppReady response may be provided asynchronously with respect to the request 702. In some embodiments, the app owner may simply check the status of the application periodically or when desired, and the completion of the build may be indicated implicitly by an updated status instead of an AppReady message as such. In at least one embodiment, an AppReady message or the equivalent status information may include a unique identifier assigned to the executable version of the application, such as a UUID of the kind discussed earlier.

A DeployApp request 706 may be submitted by the application owner 776 in the depicted embodiment after the executable version of the application has been prepared. The DeployApp request may, for example, include the unique identifier assigned to the executable version. In at least some embodiments, an indication of the expected workload level of the application, or the number of distinct execution resources to which the application is to be deployed, may be included in the DeployApp request. In response, the SVMS 740 may transmit and install the executable version of the application at one or more execution resources, and send an AppDeployed response message 708 to the application owner 776. In at least some embodiments, the application owner may not be granted administrative access (or even login access as a non-administrative user) to the execution resource(s) identified for the application. In at least one embodiment, an AppDeployed message 708 may include a networking endpoint (e.g., a URL) that can be used to access the application instance after it has been started up at an execution resource.

In various embodiments, the SVMS 740 may collect metrics pertaining to the application instances that it has deployed, such as the number of application service requests handled during some time interval, the number of software verification requests received and processed during some time interval, and so on. An application owner 776 may submit a GetAppMetrics request 710 via interfaces 777 to obtain such metrics, and a MetricSet message 712 containing the requested metrics may be provided to the application owner in the depicted embodiment.

A ModifyDeployment request 714 may be submitted by an application owner in some embodiments, e.g., to increase or decrease the number of execution resources, or to terminate the application instances. In response, if the requested modifications are feasible, the SVMS may implement the modifications and send a ModificationDone response 716 to the application owner.

In the embodiment depicted in FIG. 4, an application end user 778 may utilize programmatic interfaces 777 to submit a SoftwareVerificationRequest 718, e.g., comprising a security artifact of the kind discussed earlier, received from a running instance of the application in response to a service request. In at least some embodiments, the software verification request 718 may be automatically generated and transmitted on behalf of the end user by a client-side component of the application, such as a browser extension or plugin. In response, the SVMS may analyze the security artifact and/or additional data and send a VerificationResponse message 720, indicating whether the software being used for the end user's application service requests is trustworthy or not. In some embodiments, access to the source code of the application may also be provided via the VerificationResponse message 720.

The end user 778 may utilize programmatic interfaces 777 to examine the source code, e.g., by sending a ShowSoureCode request 722 in some embodiments. The source code may be provided via a SourceCodeFilesView message 724 in some embodiments by the SVMS—e.g., by opening a browser window which is linked to a source code repository where the source code of the application is stored. In some embodiments, after examining the source code, the end user 778 may submit a SourceCodeAcceptable messages 726 to the SVMS, indicating that the source code is satisfactory. The SVMS may store a record indicating that the source code was found acceptable, and send an AcceptanceRecordStored message 728 to the end user in some embodiments. If an end user wishes to view acceptance records indicating the perspectives of other end users with respect to a given application, a ViewAcceptanceRecords request 730 may be submitted to the SVMS, and the relevant set of acceptance records (if any) may be provided via one or more AcceptanceRecords messages 732. In some embodiments, additional types of programmatic interactions, not shown in FIG. 4, may be supported at an SVMS, or one or more of the types of programmatic interactions shown in FIG. 4 may not be supported.

Example Elements of a Key Request

Figure 5:
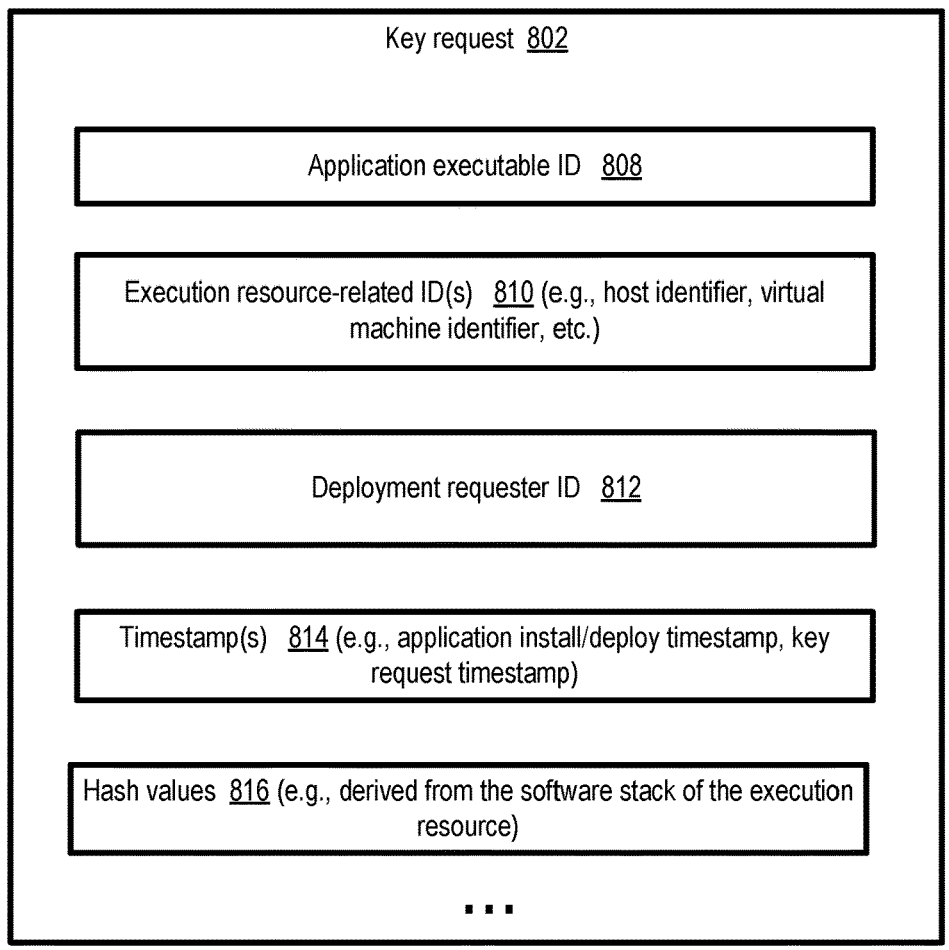
FIG. 5 illustrates example elements of an encryption key request which may be transmitted from an application to a software verification management service, according to at least some embodiments.

As indicated earlier, in at least some embodiments, during at least the initialization phase of an application deployed to a dynamically provisioned execution resource by a software verification management service (SVMS) similar to SVMS 110 of FIG. 1, an encryption key request may be sent to the SVMS from the application. FIG. 5 illustrates example elements of an encryption key request which may be transmitted from an application to a software verification management service, according to at least some embodiments. As shown, a key request 802 may include an identifier 808 of the application executable (e.g., a UUID of the kind discussed above), one or more identifiers 810 pertaining to the execution resource, an identifier 812 of the deployment requester on whose behalf the application was deployed to the execution resource, one or more timestamps 814 and/or one or more hash values 816 which may represent or be derived from the software stack of the execution resource (i.e., layers of software in addition to the application, such as an operating system, hypervisor or the like) in the depicted embodiment.

The application executable identifier 808 may be used to verify or determine, e.g., using a database similar to source-files-to-executable mapping database 122 of FIG. 1, the specific source files which were used to generate the deployed version of the application. Depending on the specific type of execution resource being used for the application (e.g., whether the execution resource is an un-virtualized server or a virtual machine), the execution resource-related identifiers 810 may include a host identifier (e.g., a fully qualified domain name), a media access control (MAC) address of a network card of the execution resource, an identifier of a hypervisor at which a virtual machine used as the execution resource is being managed, and/or an identifier assigned to the virtual machine being used in various embodiments. An identifier 812 of the deployment requester may include a unique username or client account name in some embodiments. Timestamps 814 may indicate for example the time at which the execution resource was last booted up or brought online, the time at application executable was deployed/installed at the execution resource, the time at which the key request itself is generated, and so on. In at least some embodiments, one or more hash values 816 (e.g., a signature) derived from the installed software stack of the execution resource, which may include an operating system, a hypervisor or the like, may be included in the key request 802. In some embodiments, after the SVMS verifies the state of the execution resource in response to the key request 802, the encryption key generated and provided to the running application instance may also be derived from one or more of the elements of the key request.

Example Provider Network Environment

Figure 6:
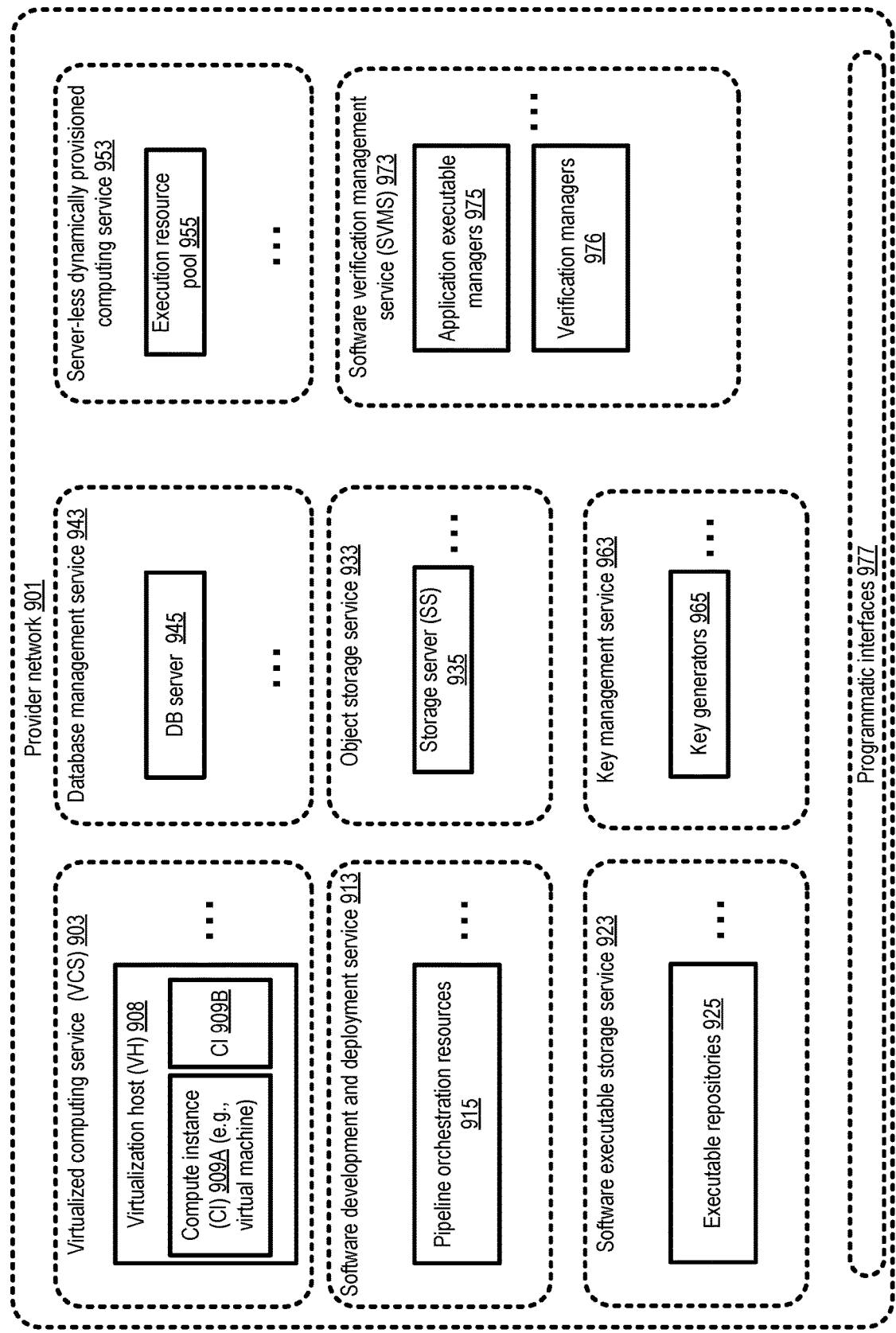
FIG. 6 illustrates an example provider network at which a software verification management service may be implemented, according to at least some embodiments.

FIG. 6 illustrates an example provider network at which a software verification management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 901 may comprise resources used to implement a plurality of services, including for example a virtualized computing service (VCS) 903, aa software development and deployment service 913, a software executable storage service 923, an object storage service 933, a database management service 943, a server-less dynamically-provisioned computing service 953, a key management service 963, as well as a software verification management service (SVMS) 973 similar in features and functionality to SVMS 110 of FIG. 1. Each of the services may include a respective set of computing devices and/or other resources in some embodiments. Components of a given service may utilize components of other services in the depicted embodiment—e.g., compute instances 909A or 909B (such as guest virtual machines) set up at virtualization hosts 908 of the virtualized computing service 903 and/or storage servers 935 of an object storage service 933 may be employed by various other services of provider network 901 to implement their respective functions. Individual ones of the services shown in FIG. 6 may implement a respective set of programmatic interfaces 677 which can be used by external and/or internal clients (where the internal clients may comprise components of other services) in the depicted embodiment. Individual ones of the services shown in FIG. 6 may each provide high levels of automated scalability, availability, data durability, and failure resilience, enabling varying levels of workloads to be handled gracefully.

SVMS 973 may comprise a plurality of components in the depicted embodiment, which may be broadly classified into two categories: application executable managers 975 (e.g., responsible for implementing functionality similar to that of secure application build coordinators 112 and deployment managers 114 of FIG. 1) and verification managers 976 (e.g., responsible for implementing functionality similar to that of resource state analyzers 116, run-time encryption key generators 118 and verification request processors 120 of FIG. 1). Application executable managers 975 may be responsible for obtaining indications of source code collections to be used for applications, and initiating the implementation of one or more auditable and cryptographically verifiable stages of software build pipelines (e.g., using pipeline orchestration resources 915 of the software development and deployment service) to which the source code is provided as input. The application executables generated via such pipelines may be stored at repositories 925 of the software executable storage service in some cases, and/or as objects (machine images or archive files) at storage servers 935 of the object storage service. The application executable managers 975 may themselves be implemented using compute instances 908 of the VCS 903 in some embodiments. Mappings between the source code and the executable versions of the applications may be stored at one or more database servers 945 of the database management service 943, and/or at the storage servers of the object storage service 933. When a request to deploy an application is received at the SVMS, an application executable manager 975 may cause the application executable to be deployed at one or more execution resources of pool 955 of a server-less dynamically provisioned computing service 953 in some embodiments. In other embodiments, the SVMS may maintain its own pool of execution resources, e.g., including some number of non-virtualized servers and/or virtual machines. Note that at least in one embodiment, multiple applications (e.g., whose deployment is requested in separate deployment requests by respective application owners/deployers) may be instantiated at a given virtualization host, e.g., using respective compute instances or virtual machines.

When a deployed application is launched at an execution resource by the SVMS, a key generation request may be transmitted during the startup phase of the application in some embodiments as discussed earlier. In some embodiments, a key generator 965 of a key management service 963 of the provider network 901 may be used to obtain the key. The verification managers 976 may be implemented using compute instances 909 in at least some embodiments. In at least one embodiment, at least some of the techniques discussed above for software verification may be implemented without acquiring resources of network-accessible services such as those shown in FIG. 6. For example, a standalone set of computing devices which are not part of a network-accessible service may be used in some embodiments.

Methods for Application Software Verification

Figure 7:
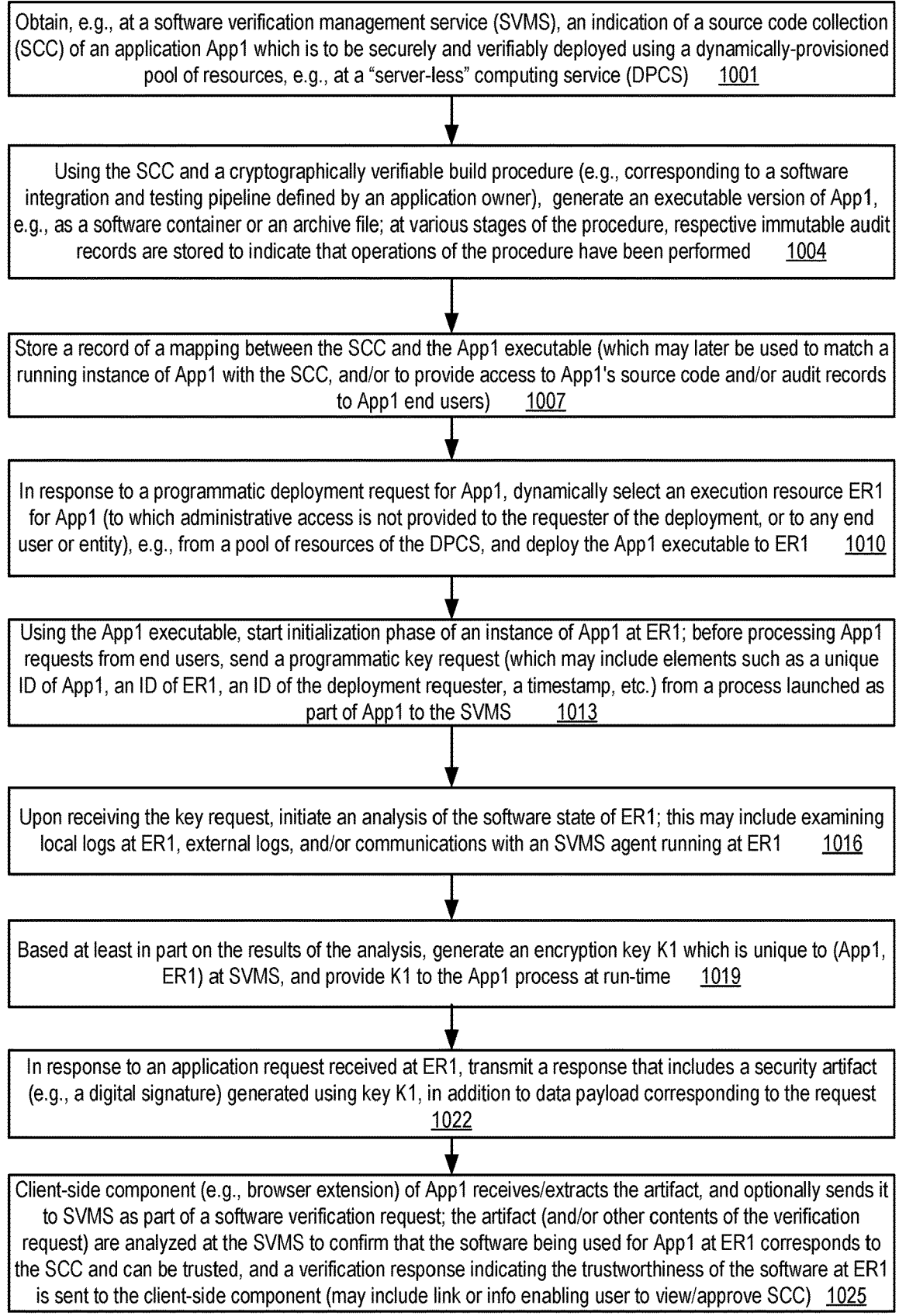
FIG. 7 is a flow diagram illustrating aspects of operations that may be performed to enable the trustworthiness of software being used for remotely-run to be verified, according to at least some embodiments.

FIG. 7 is a flow diagram illustrating aspects of operations that may be performed to enable the trustworthiness of software being used for remotely-run to be verified, according to at least some embodiments. As shown in element 1001, an indication of a source code collection (SCC) of an application App1 may be obtained, e.g., via a programmatic interface at a software verification management service (SVMS) similar in features and functionality of SVMS 110 of FIG. 1. The sender from which the SCC is obtained, e.g., the owner and/or eventual deployer of the application App1, may indicate that App1 is to be securely and verifiably deployed using a dynamically-provisioned pool of resources in the depicted embodiment, e.g., at a "server-less" computing service (SCS). The resources (e.g., including execution resources such as virtual machines, container run-time environments, un-virtualized machines etc.) of such dynamically-provisioned pools may not be assigned in advance of the requests to deploy or run applications in at least some embodiments, and login access to the resources may not be granted to the application owners or deployers; as such, the execution resources at which the applications are run may represent "black boxes" to the application owners/deployers, with configuration control not being granted to the application owners/deployers.

Using the SCC and a cryptographically verifiable build procedure (e.g., corresponding to a software integration and testing pipeline defined by an application owner), an executable version of App1 may be generated (element 1004) in various embodiments. For example, in some embodiments, the executable version may comprise a software container or an archive file formatted in accordance with a specification for executable objects acceptable at a dynamically provisioned computing service. At various stages of the build procedure, respective immutable audit records may be stored to indicate that operations of the procedure have been performed, so that any changes made to the original source code may be tracked later if needed using the audit records.

A record of a mapping between the SCC and the App1 executable (which may later be used to match a running instance of App1 with the SCC, and/or to provide access to App1's source code and/or audit records to App1 end users, may be generated and stored in at least some embodiments (element 1007).

In response to a programmatic deployment request for App 1, an execution resource ER1 may be selected from the pool of dynamically-provisioned resources for App1 in various embodiments (element 1010). Administrative access to the execution resource may not be provided to the requester of the deployment, or to any end user or entity other than components of the SVMS itself in some embodiments. In one embodiment, the SVMS may maintain its own pool of dynamically provisioned resources from which an execution resource is selected; in other embodiments, a "server-less" computing service (SCS) of a provider network may be used to obtain the execution resources (in which case control-plane components of the SCS may also have administrative access to the execution resources). The App1 executable may be transmitted to and installed at ER1 in various embodiments in response to the deployment request.

Using the App1 executable, an initialization phase of an instance of App1 may be initiated at ER1 (element 1013), e.g., as part of the deployment procedure. Before processing App1 requests from end users, a process or thread launched during the initialization phase may send a programmatic key request (which may include elements such as a unique ID of App1, an ID of ER1, an ID of the deployment requester, a timestamp, etc.) to the SVMS in the depicted embodiment. In at least some embodiments, source code to cause such a key request to be generated and sent to the SVMS (as well as source code to utilize the key to generate and include security artifacts in application responses to end users as described below) may be inserted during one of the stages of the audited build process that was used to generate the App1 executable. Note that in some embodiments, instead of sending a key request just once, the running application may send such requests multiple times to the SVMS during the lifetime of the running instance of App1, and receive corresponding keys. In embodiments in which such a multi-request approach is used, individual ones of the received keys may in effect expire, so the keys may either be renewed by sending additional requests to the SVMS, or replacement keys may be obtained from the SVMS for expired keys.

Upon receiving the key request, the SVMS may initiate an analysis of at least the software state of ER1 (element 1016) in at least some embodiments; this may for example include examining local logs at ER1, external logs, and/or communications with an SVMS agent running at ER1. In some embodiments, the state of the hardware of ER1 may also be examined. In some embodiments, a checksum of hash value representing a portion or all of the software stack of ER1 may be generated and compared to an expected checksum or hash value to validate the configuration of ER1. Based at least in part on the results of the analysis an encryption key K1 which is unique to the (App1, ER1) combination may be generated at the SVMS, and K1 may be provided to an App1 process during App1's run-time in the depicted embodiment (element 1019). The transmission of K1 to the running instance of App1 may serve as a signal that application service requests can be processed from ER1 in at least some embodiments, e.g., because the SVMS has confirmed that the software being run at ER1 is trustworthy or legitimate.

In response to an application service request received at ER1, one or more operations or computations to fulfill the request may be performed based on App1's business logic in various embodiments. Such computations or operations may result in the determination of a data payload (e.g., results of the computations) to be transmitted back to the requester. In the response transmitted to the requester from ER1, a security artifact (e.g., a digital signature) generated using the encryption key K1 may be included in addition to data payload corresponding to the request in at least some embodiments (element 1022). Note that in at least some embodiments, the data payload itself may be empty; that is, depending on the nature of the application service request, there may be no need to send any data back to the requester, but the request may nevertheless include a security artifact generated using the encryption key.

A client-side component (e.g., a browser extension or plug-in, in scenarios where a browser is used to submit App1 requests and receive corresponding responses) of App1 may receive and extract the security artifact in at least some embodiments (element 1025). Optionally, at least the security artifact may be sent to the SVMS as part of a software verification request. In such a scenario, the artifact (and/or other contents of the verification request) may be analyzed at the SVMS to confirm that the software being used for App1 at ER1 corresponds to the SCC and can therefore be trusted. A verification response indicating the trustworthiness of the software at ER1 may be sent to the client-side component (may include a web link or other information enabling an end user to view/approve the source code collection or SCC) in at least some embodiments. In some embodiments, the mapping between SCC and the identifier of the App1 executable may be utilized at one or more stages during the software verification: e.g., the mapping may be checked at the SVMS prior to issuing the encryption key, and/or the mapping may be checked at the SVMS to prepare the verification response. In at least some embodiments, the verification request sent to the SVMS may contain enough information about the application service request that the SVMS is able to generate a response and compare the SVMS-generated response's security artifact with the security artifact included in the verification request. If the two artifacts match, this would serve as further evidence of the trustworthiness of the software of the running App1 instance in such embodiments.

It is noted that in various embodiments, some of the operations shown in FIG. FIG. 7 may be implemented in a different order than that shown in the figure, or may be performed in parallel rather than sequentially. Additionally, some of the operations shown in FIG. 7 may not be required in one or more implementations.

Use Cases

The techniques described above, of implementing a software verification management service which orchestrates a cryptographically verifiable build procedure for application source code, the dynamic provisioning and selection of execution resources to which direct access is not provided to application owners, and the generation and use of encryption keys to verify the software state of the execution resources at run-time, may provide numerous benefits in various environments. In many cases, applications that may potentially handle sensitive data, such as personally-identifiable information (PII) and the like, may be implemented using remote cloud computing infrastructure, e.g., using computing resources to which end users have no administrative access. As such, the software verification service may provide a seamless methodology enabling end users to obtain auditable evidence regarding the particular source code which is being used to process the end users application requests, which may significantly increase the trust of the end users in the applications being run remotely.

Illustrative Computer System

Figure 8:
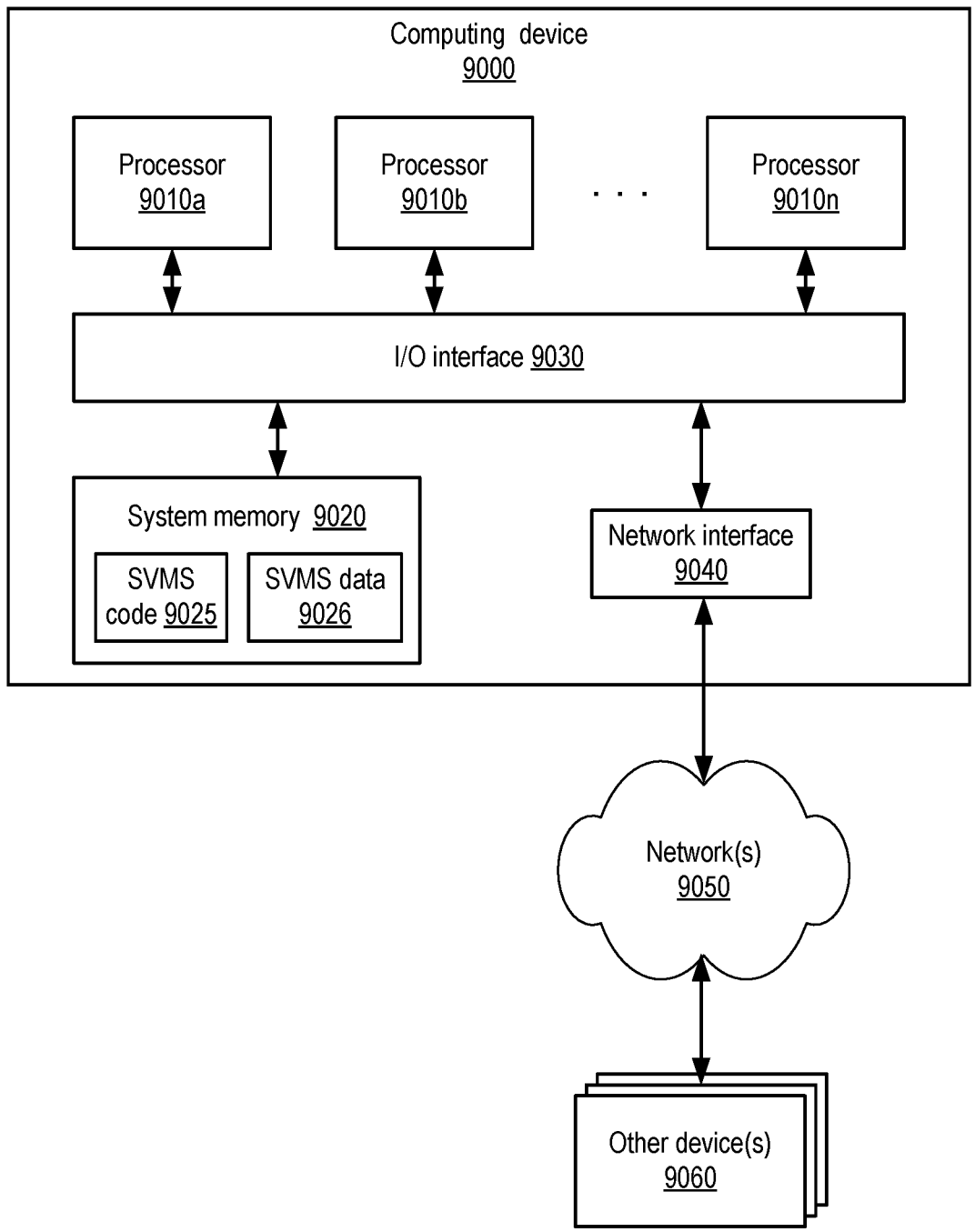
FIG. 8 is a block diagram illustrating an example computing device that may be used in at least some embodiments.

In at least some embodiments, a server that implements a portion or all of one or more of the technologies described herein, including the techniques for various elements of a software verification management service similar in functionality to SVMS 110 of FIG. 1, as well as resources of one or more other service of a provider network, may include a general-purpose computer system that includes or is configured to access one or more computer-accessible media. FIG. 8 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above as being implemented at a software verification management service (SVMS), are shown stored within system memory 9020 as SVMS code 9025 and SVMS data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 7, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices;
wherein the one or more computing devices include instructions that upon execution on or across one or more processors cause the one or more computing devices to:
obtain an indication of a collection of source code of a network-accessible application to be deployed using dynamic provisioning at a provider network;
generate an executable version of the network-accessible application, using at least the collection of source code as input to an audited, cryptographically verifiable build procedure, wherein respective immutable audit records are stored to indicate one or more operations performed during the build procedure;
store a database record indicating a mapping between the collection of source code and an identifier of the executable version;

in response to a deployment request received via a programmatic interface, cause the executable version to be deployed at an execution resource, wherein the execution resource is dynamically provisioned, and wherein administrative access to the execution resource is not provided to a submitter of the deployment request;

in response to a programmatic key request from a software process instantiated via the executable version at the execution resource, wherein the programmatic key request includes at least respective identifiers of (a) the executable version, (b) the execution resource and (c) a submitter of the deployment request, analyze state information of the execution resource; and based at least in part on a result of the analysis of the state information, provide an encryption key to the software process;

cause a security artifact to be included in a response generated at the execution resource to an application request from a client, wherein the security artifact is based at least in part on the encryption key; and provide, in response to a software verification request from the client, wherein the software verification request includes the security artifact, a verification response indicating that software used to implement the network-accessible application at the execution resource corresponds to the collection of source code, wherein the verification response is based at least in part on an analysis of the security artifact and the database record.

2. The system as recited in claim 1, wherein the one or more computing devices include further instructions that upon execution on or across the one or more processors further cause the one or more computing devices to:
provide, to the client via a programmatic interface, access to at least a portion of the collection of source code.

3. The system as recited in claim 1, wherein the one or more computing devices include further instructions that upon execution on or across the one or more processors further cause the one or more computing devices to:
generate, at the execution resource using the encryption key, a digital signature of at least a portion of the response to the application request, wherein the security artifact includes the digital signature.

4. The system as recited in claim 1, wherein the one or more computing devices include further instructions that upon execution on or across the one or more processors further cause the one or more computing devices to:
identify one or more additional cryptographic keys to encrypt communications between the execution resource and the client, wherein the additional cryptographic keys are not used for software verification.

5. The system as recited in claim 1, wherein the executable version of the application comprises one or more of: (a) a software container or (b) an archive file formatted according to a specification of a dynamically provisioned computing service.

6. A method, comprising:
performing, at one or more computing devices:
obtaining, via an audited build procedure applied to a collection of source code, an executable version of an application;
in response to a deployment request received via a programmatic interface, causing the executable version of the application to be deployed at a particular execution resource selected from a pool of dynamically provisioned resources, wherein administrative access to the particular execution resource is not provided to a source of the deployment request;
transmitting, after the application has been instantiated, an encryption key to the application at the particular execution resource, wherein the encryption key is generated based at least in part on an analysis of the execution resource initiated subsequent to the deployment of the executable version; and
providing, in response to a software verification request from a first client, wherein the software verification request includes a first security artifact, a verification response indicating that software used to implement the application at the execution resource meets a trust criterion, wherein the verification response is based at least in part on an analysis of the first security artifact, and wherein the first security artifact is generated using the encryption key.

7. The method as recited in claim 6, further comprising performing, at the one or more computing devices:
providing, to the first client via a programmatic interface, access to at least a portion of the collection of source code.

8. The method as recited in claim 6, further comprising performing, at the one or more computing devices:
generating, at the particular execution resource using the encryption key, a digital signature of at least a portion of a response to an application request from the client, wherein the first security artifact includes the digital signature.

9. The method as recited in claim 6, further comprising performing, at the one or more computing devices:
identifying one or more additional cryptographic keys to encrypt communications between the execution resource and the client, wherein the one or more additional cryptographic keys are not used for software verification.

10. The method as recited in claim 6, further comprising performing, at the one or more computing devices:
generating the first security artifact at the particular execution resource, using (a) the encryption key and (b) a data payload of a response to a first client request;
including the first security artifact in a response to the first client request;
generating another security artifact at the execution resource, using (a) the encryption key and (b) a data payload of a response to a second client request, wherein the other security artifact differs from the first security artifact; and
including the second security artifact in a response to the second client request.

11. The method as recited in claim 10, further comprising performing, at the one or more computing devices:
transmitting a response to a third client request, wherein the response to the third client request does not include a security artifact generated using the encryption key.

12. The method as recited in claim 6, further comprising performing, at the one or more computing devices:
submitting a key request by the application, wherein the transmitting of the encryption key is responsive to the key request, wherein the key request comprises an identifier of the executable version, and wherein the identifier of the executable version is based at least in part on a location at which the executable version is stored within a repository.

13. The method as recited in claim 6, further comprising performing, at the one or more computing devices:
  transmitting an extension to be incorporated within a client-side software program used to submit application requests directed to at least the particular execution resource, wherein the software verification request is generated by the extension.

14. The method as recited in claim 6, further comprising performing, at the one or more computing devices:
  storing a record, in response to a message received from the first client after the verification response has been provided, indicating that at least a portion of the source code of the application has been examined by the first client based on information included in the verification response; and
  providing, to a second client via a programmatic interface, an indication of the record.

15. The method as recited in claim 6, wherein the analysis of the execution resource comprises an examination of one or more of: (a) one or more log records indicating respective state changes of the execution resource, (b) a response obtained from a monitoring agent associated with the execution resource.

16. One or more non-transitory computer-accessible storage media storing program instructions that when executed on or across one or more processors cause one or more computer systems to:
  cause an executable version of an application to be deployed at a particular execution resource of a dynamically provisioned set of resources;
  transmit a first encryption key to the execution resource, wherein the first encryption key is generated based at least in part on an analysis of the particular execution resource initiated subsequent to the deployment of the executable version; and
  provide, in response to a software verification request, wherein the software verification request includes a first security artifact, a verification response indicating that software used to implement the application at the particular execution resource meets a trust criterion, wherein the verification response is based at least in part on an analysis of the first security artifact, and wherein the first security artifact is generated using the first encryption key.

17. The one or more non-transitory computer-accessible storage media as recited in claim 16, storing further program instructions that when executed on or across the one or more processors further cause the one or more computer systems to:
  provide, via a programmatic interface, access to at least a portion of source code of the application.

18. The one or more non-transitory computer-accessible storage media as recited in claim 16, storing further program instructions that when executed on or across the one or more processors further cause the one or more computer systems to:
  cause to be generated, at the particular execution resource using the encryption key, a digital signature of at least a portion of a response to an application request, wherein the first security artifact includes the digital signature.

19. The one or more non-transitory computer-accessible storage media as recited in claim 16, storing further program instructions that when executed on or across the one or more processors further cause the one or more computer systems to:
  cause the executable version of the application to be deployed at a plurality of execution resources including a second execution resource, wherein the number of execution resources at which the executable version is deployed is based at least in part on an estimated workload level of the application; and
  transmit a second encryption key to the application running at the second execution resource.

20. The one or more non-transitory computer-accessible storage media as recited in claim 16, wherein the particular execution resource comprises a first virtual machine running at a virtualization host, wherein the one or more non-transitory computer-accessible storage media store further program instructions that when executed on or across the one or more processors further cause the one or more computer systems to:
  instantiate, at the virtualization host, a second virtual machine;
  deploy, to the second virtual machine in response to another deployment request, an executable version of another application; and
  transmit, to the second virtual machine, a second encryption key to be used to generate at least one security artifact to be included in a response to an application request directed to the other application.

* * * * *